US012693727B2

(12) United States Patent
Hieida

(10) Patent No.: US 12,693,727 B2
(45) Date of Patent: Jul. 28, 2026

(54) ENVIRONMENTAL STATE NOTIFICATION DEVICE AND ENVIRONMENTAL STATE NOTIFICATION METHOD

(71) Applicant: SONY GROUP CORPORATION, Tokyo (JP)

(72) Inventor: Yusuke Hieida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/557,829

(22) PCT Filed: Mar. 1, 2022

(86) PCT No.: PCT/JP2022/008481
§ 371 (c)(1),
(2) Date: Oct. 27, 2023

(87) PCT Pub. No.: WO2022/244372
PCT Pub. Date: Nov. 24, 2022

(65) Prior Publication Data
US 2024/0220001 A1 Jul. 4, 2024

(30) Foreign Application Priority Data
May 21, 2021 (JP) ................................. 2021-086237

(51) Int. Cl.
*G06F 3/01* (2006.01)
*G06F 1/16* (2006.01)
(52) U.S. Cl.
CPC .............. *G06F 3/011* (2013.01); *G06F 1/163* (2013.01)

(58) Field of Classification Search
CPC ................................ G06F 3/011; G06F 1/163
See application file for complete search history.

(56) References Cited

U.S. PATENT DOCUMENTS 6,023,223 A * 2/2000 Baxter, Jr. ............. G06Q 10/06
340/539.18
8,253,589 B2 * 8/2012 Grimm ................. G01S 5/0072
340/901
(Continued)

FOREIGN PATENT DOCUMENTS

JP 2015154350 A 8/2015
JP 2017-158083 A 9/2017
(Continued)

OTHER PUBLICATIONS

International Search Report and Written Opinion of PCT Application No. PCT/JP2022/008481, issued on May 17, 2022, 08 pages of ISRWO.

*Primary Examiner* — Bryan Earles
(74) *Attorney, Agent, or Firm* — CHIP LAW GROUP

(57) ABSTRACT
A technology advantageous for improving safety of a user is provided. An environmental state notification device includes an environment information acquisition unit that is attached to a user and acquires environment information data indicating information regarding a surrounding environment of the user, an environmental state recognition unit that recognizes a state of a surrounding environment with respect to the user on the basis of the environment information data, and a notification unit that notifies the user according to the state of the surrounding environment with respect to the user recognized by the environmental state recognition unit.

20 Claims, 13 Drawing Sheets

(56)     References Cited

U.S. PATENT DOCUMENTS

| | | | |
|---|---|---|---|
| 10,997,417 B2 * | 5/2021 | Birch | H04N 23/90 |
| 11,074,810 B2 * | 7/2021 | Wang | B60Q 1/50 |
| 11,587,121 B2 * | 2/2023 | Ueno | G06Q 30/0267 |
| 11,626,001 B1 * | 4/2023 | Khmelev | G08B 21/12 |
| | | | 340/532 |
| 11,856,367 B2 * | 12/2023 | Feilner | G08B 7/06 |
| 12,039,223 B2 * | 7/2024 | Tsuruga | G06F 3/013 |
| 2016/0093207 A1 * | 3/2016 | Di Censo | G08G 1/005 |
| | | | 340/944 |
| 2016/0210834 A1 * | 7/2016 | Dayal | G01C 21/12 |
| 2017/0011210 A1 * | 1/2017 | Cheong | A61B 5/681 |
| 2018/0082656 A1 * | 3/2018 | Ito | G02B 27/0176 |
| 2018/0310116 A1 * | 10/2018 | Arteaga | G06F 3/012 |

FOREIGN PATENT DOCUMENTS

| | | | |
|---|---|---|---|
| JP | 2017-536595 A | 12/2017 |
| WO | 2016/170854 A1 | 10/2016 |

* cited by examiner

Figure 5:
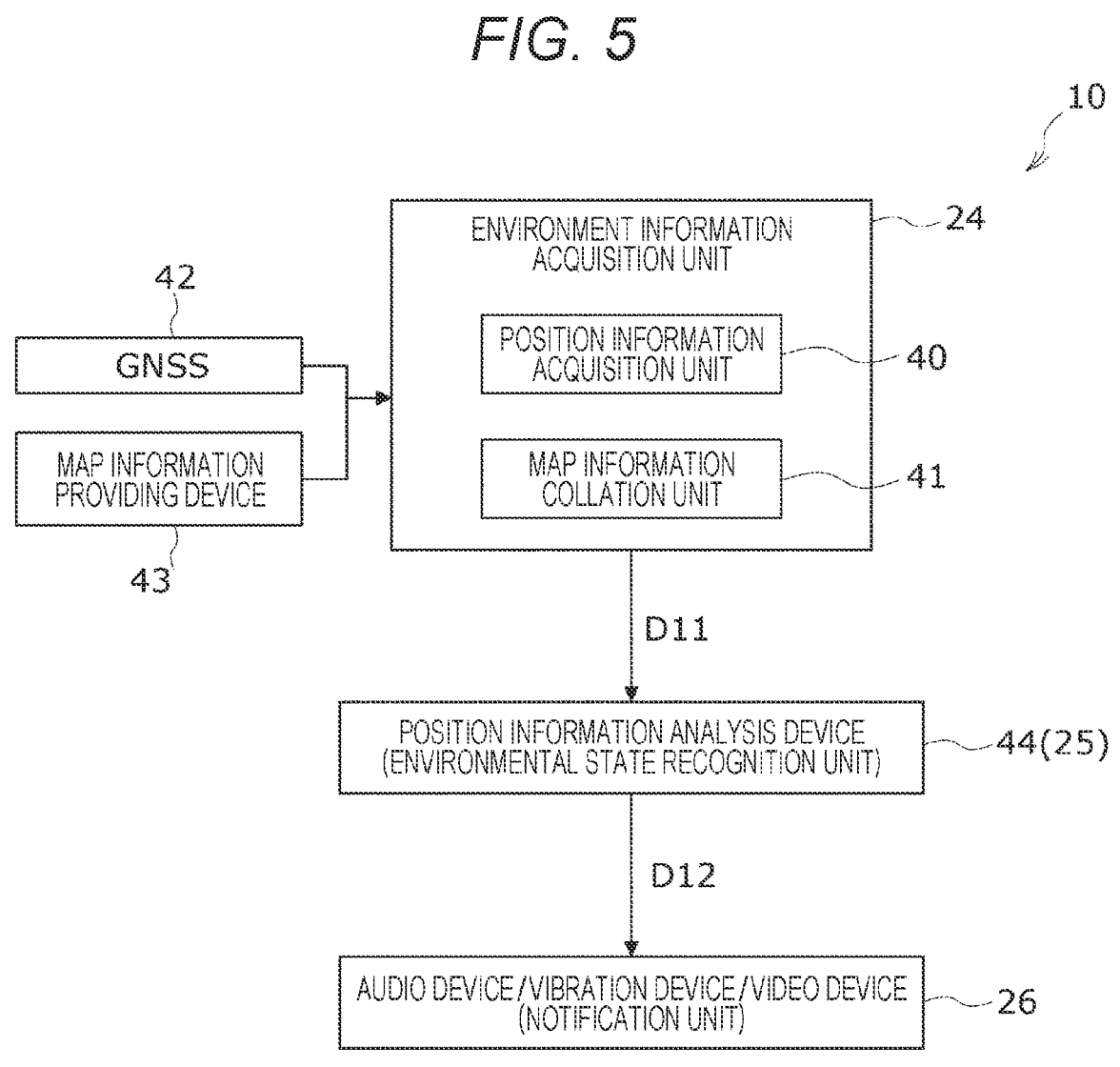

ENVIRONMENT INFORMATION
ACQUISITION UNIT ⟋ 24

42

GNSS

MAP INFORMATION
PROVIDING DEVICE

43

POSITION INFORMATION
ACQUISITION UNIT ⟋ 40

MAP INFORMATION
COLLATION UNIT ⟋ 41

D11

POSITION INFORMATION ANALYSIS DEVICE
(ENVIRONMENTAL STATE RECOGNITION UNIT) — 44(25)

D12

AUDIO DEVICE/VIBRATION DEVICE/VIDEO DEVICE
(NOTIFICATION UNIT) — 26

Figure 11:
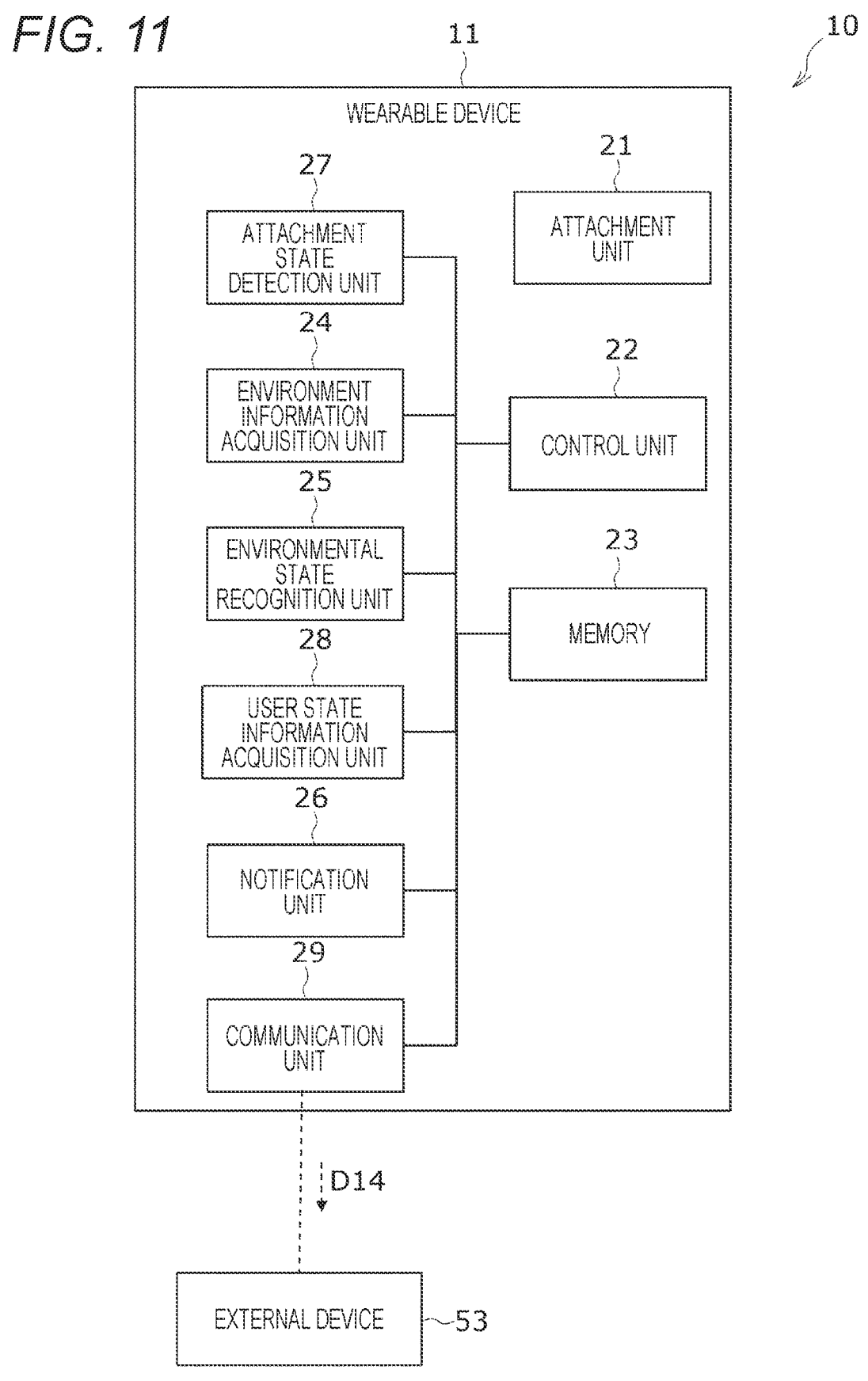

WEARABLE DEVICE

27
ATTACHMENT STATE DETECTION UNIT

21
ATTACHMENT UNIT

24
ENVIRONMENT INFORMATION ACQUISITION UNIT

22
CONTROL UNIT

25
ENVIRONMENTAL STATE RECOGNITION UNIT

23
MEMORY

28
USER STATE INFORMATION ACQUISITION UNIT

26
NOTIFICATION UNIT

29
COMMUNICATION UNIT

D14

EXTERNAL DEVICE 53

*FIG. 12*

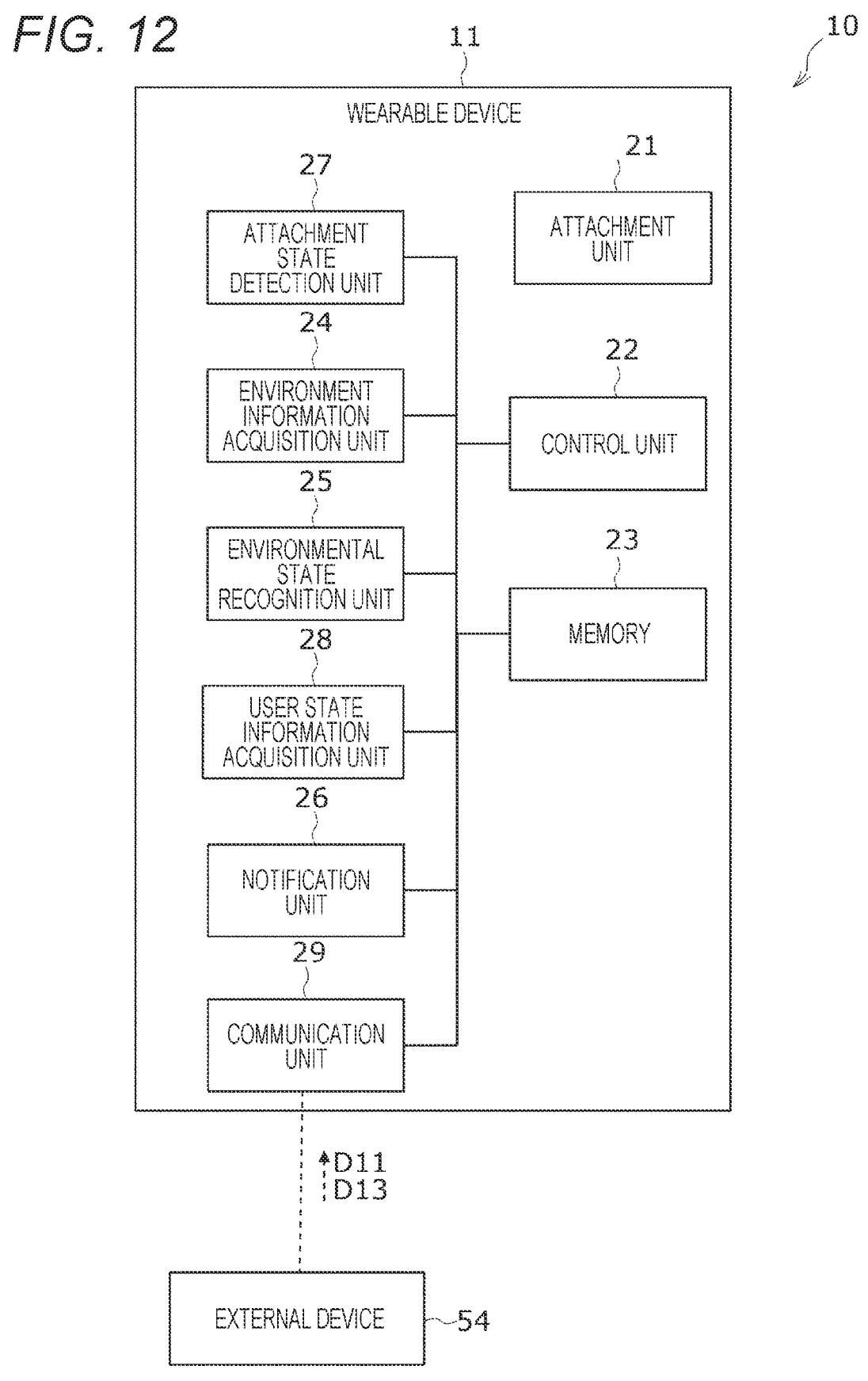

WEARABLE DEVICE — 11

10

27 — ATTACHMENT STATE DETECTION UNIT

21 — ATTACHMENT UNIT

24 — ENVIRONMENT INFORMATION ACQUISITION UNIT

22 — CONTROL UNIT

25 — ENVIRONMENTAL STATE RECOGNITION UNIT

23 — MEMORY

28 — USER STATE INFORMATION ACQUISITION UNIT

26 — NOTIFICATION UNIT

29 — COMMUNICATION UNIT

↑D11
D13

EXTERNAL DEVICE — 54

ENVIRONMENTAL STATE NOTIFICATION DEVICE AND ENVIRONMENTAL STATE NOTIFICATION METHOD

CROSS REFERENCE TO RELATED APPLICATIONS

This application is a U.S. National Phase of International Patent Application No. PCT/JP2022/008481 filed on Mar. 1, 2022, which claims priority benefit of Japanese Patent Application No. JP 2021-086237 filed in the Japan Patent Office on May 21, 2021. Each of the above-referenced applications is hereby incorporated herein by reference in its entirety.

TECHNICAL FIELD

The present disclosure relates to an environmental state notification device, an environmental state notification method, and a program.

BACKGROUND ART

In recent years, various wearable devices that can be worn by a user have been proposed.

Patent Document 1 discloses a wearable terminal on which a camera is mounted. In the wearable terminal, the angle of view of the camera is controlled according to the behavior state of the user.

CITATION LIST

Patent Document

Patent Document 1: Japanese Patent Application Laid-Open No. 2017-158083

SUMMARY OF THE INVENTION

Problems to be Solved by the Invention

With increasing attention to automated driving of vehicles, safe driving support devices mounted on vehicles have also developed dramatically. On the other hand, safe driving support devices are under development, and further improvement of safety functions is required. Furthermore, a considerable number of vehicles not equipped with any safe driving support device travel on public roads. Thus, pedestrians still need to walk while paying sufficient attention to the vehicles.

In addition, pedestrians need to ensure safety by paying sufficient attention not only to the vehicles but also to other existence such as a suspicious person. Moreover, it is very effective from the viewpoint of improving safety of pedestrians to prevent pedestrians from approaching and entering an area requiring attention.

The present disclosure has been made in view of the above circumstances, and provides a technology advantageous for improving safety of a user.

Solutions to Problems

One aspect of the present disclosure relates to an environmental state notification device including an environment information acquisition unit that is attached to a user and acquires environment information data indicating information regarding a surrounding environment of the user, an environmental state recognition unit that recognizes a state of a surrounding environment with respect to the user on the basis of the environment information data, and a notification unit that notifies the user according to the state of the surrounding environment with respect to the user recognized by the environmental state recognition unit.

The environment information acquisition unit may include a wave sensor that receives at least one of an electromagnetic wave or a sound wave from an environment surrounding the user and acquires the environment information data.

The wave sensor may acquire an image of an environment surrounding the user.

The environment information acquisition unit may include an emission unit that emits a detection electromagnetic wave or a detection sound wave, and the wave sensor may receive the reflected detection electromagnetic wave or the detection sound wave.

The environment information acquisition unit may include a position information acquisition unit that acquires position information of the user, and a map information collation unit that acquires the environment information data on the basis of the position information and the map information.

The position information acquisition unit may acquire the position information of the user from a satellite positioning system.

The environmental state notification device may include a communication unit that communicates data, in which the environmental state recognition unit may recognize the state of the surrounding environment with respect to the user on the basis of the environment information data acquired by the environment information acquisition unit and the environment information data transmitted from a first external device via the communication unit.

The environmental state notification device may include a user state information acquisition unit that acquires user state data indicating a state of the user, in which the environmental state recognition unit may recognize the state of the surrounding environment with respect to the user on the basis of the environment information data and the user state data.

The user state information acquisition unit may include a sensor that detects at least one of a moving speed or an acceleration of the user.

The environmental state recognition unit may predict a movement course of the user on the basis of the user state data, and may recognize the state of the surrounding environment with respect to the user on the basis of the predicted movement course of the user.

The environmental state recognition unit may acquire a dynamic map of the surrounding environment of the user, and recognizes the state of the surrounding environment with respect to the user on the basis of the environment information data and the dynamic map.

The notification unit may be attached to the user.

The notification unit may notify the user through at least one of hearing, vision, or tactile sense.

The notification unit may notify a second external device that exists in the surrounding environment of the user and is not attached to the user according to the state of the surrounding environment with respect to the user recognized by the environmental state recognition unit.

The second external device may be a vehicle.

The environmental state notification device may further include a communication unit that communicates data, in which the communication unit may transmit, to a third external device, data indicating a state of the surrounding environment with respect to the user recognized by the environmental state recognition unit.

The environmental state notification device may include an attachment state detection unit that detects an attachment state of the environment information acquisition unit with respect to the user, in which the notification unit may notify the user according to a detection result of the attachment state detection unit.

Another aspect of the present disclosure relates to an environmental state notification method including the steps of: acquiring, by an environment information acquisition unit that is attached to a user, environment information data indicating information regarding a surrounding environment of the user; recognizing, by an environmental state recognition unit, a state of a surrounding environment with respect to the user on the basis of the environment information data; and notifying, by a notification unit, the user according to the state of the surrounding environment with respect to the user recognized by the environmental state recognition unit.

Another aspect of the present disclosure relates to a program for causing a computer to execute a procedure of acquiring, by an environment information acquisition unit that is attached to a user, environment information data indicating information regarding a surrounding environment of the user, a procedure of recognizing, by an environmental state recognition unit, a state of a surrounding environment with respect to the user on the basis of the environment information data, and a procedure of notifying, by a notification unit, the user according to the state of the surrounding environment with respect to the user recognized by the environmental state recognition unit.

BRIEF DESCRIPTION OF DRAWINGS

FIG. 5 is a diagram illustrating another example of the functional configuration of the environmental state notification device.

FIG. 11 is a diagram illustrating another example of the functional configuration of the environmental state notification device.

FIG. 12 is a diagram illustrating another example of the functional configuration of the environmental state notification device.

MODE FOR CARRYING OUT THE INVENTION

Figure 1:
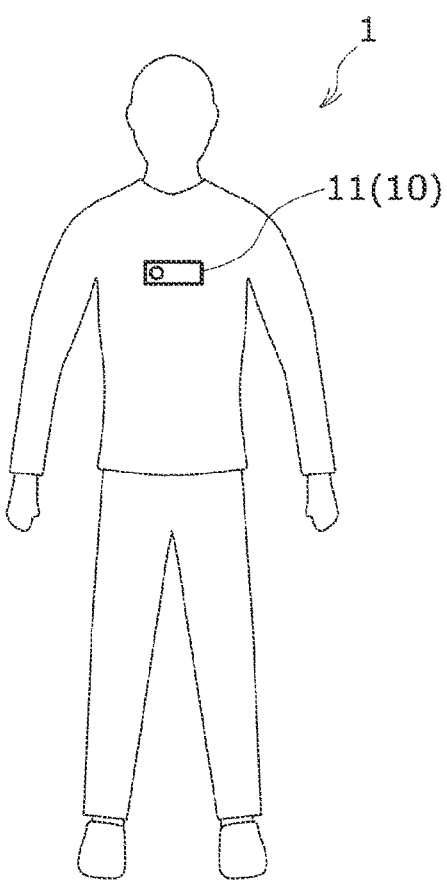
FIG. 1 is a diagram illustrating an example of a wearable device that functions as an environmental state notification device.
Figure 2:
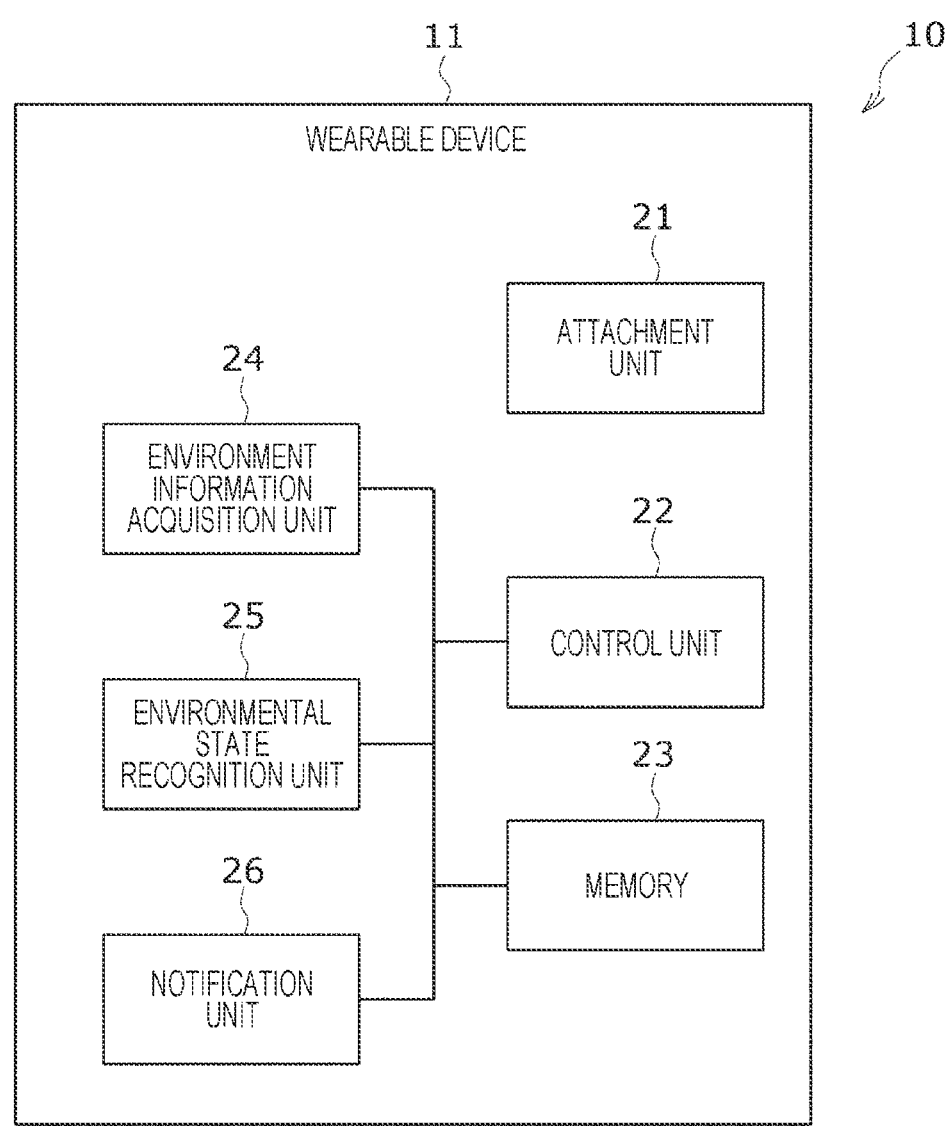
FIG. 2 is a diagram illustrating an example of a functional configuration of the wearable device.

FIG. 1 is a diagram illustrating an example of a wearable device 11 that functions as an environmental state notification device 10. FIG. 2 is a diagram illustrating an example of a functional configuration of the wearable device 11.

The wearable device 11 illustrated in FIG. 1 is attached to clothing of a user 1.

The attachment place of the wearable device 11 is not limited to clothing, and the wearable device 11 can be attached to the user 1 in any manner. Typically, the wearable device 11 is worn by the user 1 in the form of a wristwatch, a neck hanger, glasses, earphones (including headphones), a ring, or the like.

The wearable device 11 illustrated in FIG. 2 includes an attachment unit 21, a control unit 22, a memory 23, an environment information acquisition unit 24, an environmental state recognition unit 25, and a notification unit 26.

The attachment unit 21 is used to attach the wearable device 11 to the user 1. A specific structure of the attachment unit 21 is not limited, and an attachment mode of the wearable device 11 to the user 1 is also not limited.

In a case where the wearable device 11 is attached to the clothing of the user 1 as illustrated in FIG. 1, the attachment unit 21 includes a magnet, and the wearable device 11 can be detachably attached to the clothing by sandwiching the clothing using a magnetic force. However, the wearable device 11 may be attached to the clothing of the user 1 in another form such as a clip as the attachment unit 21.

Furthermore, in the case of the wristwatch-type wearable device 11, the attachment unit 21 can be formed by a belt (wristband).

As described above, the attachment unit 21 has a configuration and a shape suitable for an attachment mode of the wearable device 11 to the user 1.

The control unit 22 controls each functional component included in the wearable device 11. The control unit 22 typically includes various processors such as a central processing unit (CPU) or a micro processing unit (MPU).

A specific configuration of the control unit 22 is not limited. The control unit 22 may be configured by a single device, and the control unit 22 may integrally control a plurality of functional components included in the wearable device 11. Alternatively, the control unit 22 may include a plurality of devices. For example, a corresponding control device (control unit 22) may be built in each functional component of the wearable device 11.

The memory 23 stores various data (including programs). The memory 23 includes at least one of a nonvolatile storage medium or a volatile storage medium. The memory 23 can include, for example, an electrically erasable programmable read only memory (EEPROM) or a random access memory (RAM). Furthermore, the memory 23 can include a magnetic storage device such as a hard disc drive (HDD), a semiconductor storage device, an optical storage device, or a magneto-optical storage device.

Each functional component (including the control unit 22) included in the wearable device 11 may read various data from the memory 23, may store new data in the memory 23, or may update the data stored in the memory 23.

The environment information acquisition unit 24 is attached to the user 1 and acquires environment information data indicating information of a surrounding environment of the user 1. A specific configuration of the environment information acquisition unit 24 and specific information included in the environment information data are not limited.

Typically, the environment information acquisition unit 24 includes a wave sensor that operates under the control of the control unit 22. The wave sensor receives at least one of an electromagnetic wave or a sound wave (for example, an ultrasonic wave) from an environment surrounding the user 1 and acquires the environment information data.

The electromagnetic wave here may include light such as visible light and radio waves such as millimeter waves. Therefore, the wave sensor may be configured as an image sensor that acquires an image (a still image and/or a moving image) of the surrounding environment of the user 1, or may be configured as a sensor that receives radio waves and light reflected by objects around the user 1.

Specifically, the environment information acquisition unit 24 may include a camera (imaging device), light detection and ranging (LiDAR), time of flight (ToF), a millimeter wave radar, and/or an ultrasonic sensor. The camera can employ various imaging methods such as a stereo camera, a monocular camera, and an infrared camera.

The environment information acquisition unit 24 may include a sensor fusion unit (not illustrated). The sensor fusion unit performs sensor fusion processing of obtaining new information from a combination of a plurality of types of sensor data (for example, image data and radar detection data) different from each other. The sensor fusion processing may include, for example, processing of integrating, fusing, or combining multiple types of sensor data.

The environmental state recognition unit 25 recognizes the state of the surrounding environment with respect to the user 1 on the basis of the environment information data acquired by the environment information acquisition unit 24.

The "state of the surrounding environment with respect to the user 1" mentioned here can include a state regarding safety of the surrounding environment with respect to the user 1. For example, whether or not a moving object such as a vehicle or a bicycle is approaching the user 1 and whether or not the current position or a future predicted position of the user 1 is a position requiring attention can be included in the "state of the surrounding environment with respect to the user 1". Furthermore, whether or not a moving object such as a vehicle or a living thing such as a human located near the user 1 shows suspicious behavior can be included in the "state of the surrounding environment with respect to the user 1".

Note that the "state of the surrounding environment with respect to the user 1" may include a state of the surrounding environment that may affect the user 1 other than safety.

In a case where the environmental state recognition unit 25 analyzes the environment information data, a specific analysis method by the environmental state recognition unit 25 is not limited.

For example, the environmental state recognition unit 25 includes artificial intelligence (AI), and can analyze the environment information data using learned data obtained through learning by deep learning. Here, the learned data may include a learned parameter and an inference program in which the learned parameter is incorporated. The learned parameter and the inference program are obtained, for example, as a result of learning using raw data and/or a learning data set obtained from the raw data.

The environmental state recognition unit 25 of the present example can use learned data in which "environment information data and/or data derived from the environment information data" is associated with "data regarding the state of the surrounding environment with respect to the user 1". The environmental state recognition unit 25 can obtain the "data regarding the state of the surrounding environment with respect to the user 1" as an output by applying the "environment information data and/or data derived from the environment information data" to the learned data as an input.

The notification unit 26 notifies the user 1 according to the "state of the surrounding environment with respect to the user 1" recognized by the environmental state recognition unit 25.

A method of notifying the user 1 by the notification unit 26 is not limited. The notification unit 26 attached to the user 1 can typically notifies the user 1 through sensation of the user 1 (for example, at least one of auditory sense, visual sense, or tactile sense).

For example, the notification unit 26 can notify the user 1 of the "state of the surrounding environment with respect to the user 1" by voice or music provided to the user 1 via a speaker or an earphone. In particular, notification through hearing of the user 1 can promptly and intuitively notify the user 1, and basically does not impair visual information of the user 1.

Recently, voice and music are also provided to the user 1 through various acoustic technologies such as stereophonic sound technology. By notifying the user 1 on the basis of such various acoustic technologies, the notification unit 26 can bring about new beneficial effects such as recognition of a position and a direction of an object requiring attention and induction of a reflective safe action of the user 1. A utilization example of the stereophonic sound technology in the notification unit 26 will be described later.

Furthermore, the notification unit 26 can notify the user 1 of the "state of the surrounding environment with respect to the user 1" by a video provided to the user 1 via glasses (for example, augmented reality (AR) glasses). As an example, the notification unit 26 can display a video indicating the state of the surrounding environment with respect to the user 1 on the glasses. Furthermore, in a case where an object requiring attention is approaching the user 1 or the user 1 is approaching an area requiring attention, the notification unit 26 may turn off the video display on the glasses so that the user 1 can visually recognize the surrounding environment.

Furthermore, the notification unit 26 can notify the user 1 of the "state of the surrounding environment with respect to the user 1" by a tactile change such as vibration provided to the user 1 via a haptics device (for example, a vibration device or a pressure variable device).

Figure 3:
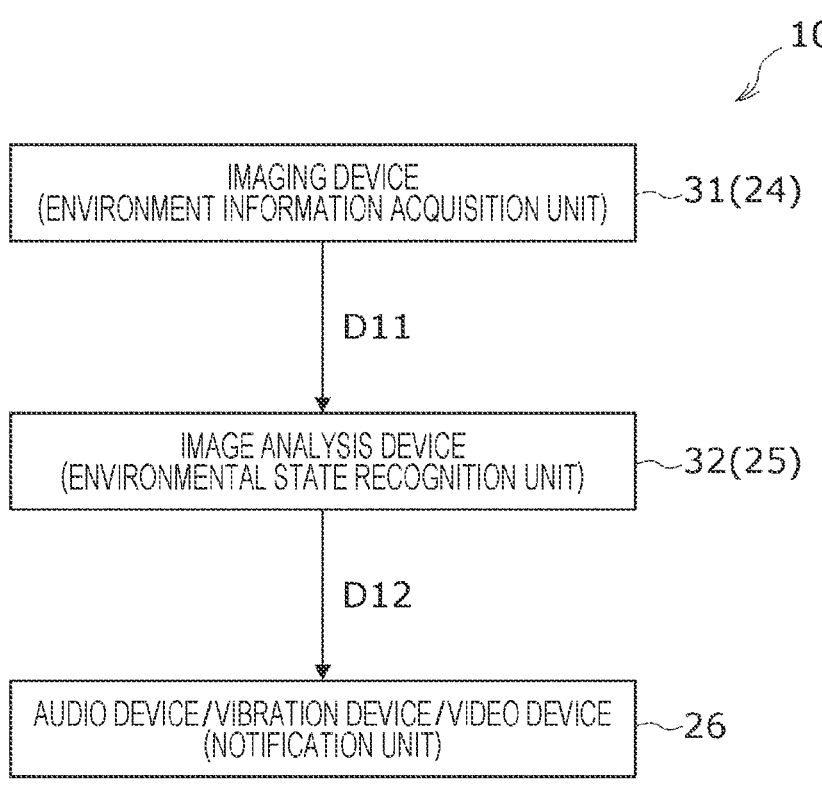
FIG. 3 is a diagram illustrating an example of a functional configuration of the environmental state notification device.

FIG. 3 is a diagram illustrating an example of a functional configuration of the environmental state notification device 10.

In the example illustrated in FIG. 3, the environment information acquisition unit 24 includes an imaging device 31 that acquires an image of the environment surrounding the user 1, and includes an image sensor (Complementary Metal Oxide Semiconductor (CMOS) sensor, and the like) as a wave sensor.

The imaging device 31 transmits a captured image of the surrounding environment to the environmental state recognition unit 25 as environment information data D11. The environmental state recognition unit 25 includes an image analysis device 32 that analyzes the captured image transmitted from the imaging device 31.

The image analysis device 32 recognizes the "state of the surrounding environment with respect to the user 1" by analyzing the captured image. For example, the image analysis device 32 can recognize whether or not the captured image includes a moving object such as a vehicle approaching the user 1, an unsafe area such as a roadway, and/or other objects to which a pedestrian should pay attention.

A specific image analysis method performed by the image analysis device 32 is not limited. For example, the image analysis device 32 may recognize the type of the object around the user 1 by performing recognition processing such as semantic segmentation.

Furthermore, the image analysis device 32 may estimate the self-position and create an environmental map (local map) using a technology such as simultaneous localization and mapping (SLAM) on the basis of the image data acquired by the imaging device 31.

The local map can be created as, for example, a three-dimensional high-precision map, an occupancy grid map, or the like. The three-dimensional high-precision map can be created as, for example, a point cloud map to be described later, or the like. The occupancy grid map can be created as a map in which a three-dimensional or two-dimensional space around the user 1 is divided into grids (lattices) of a predetermined size, and an occupancy state of an object is represented in units of grids. The occupancy state of the object mentioned here is indicated by, for example, the presence or absence or existence probability of the object.

Then, the image analysis device 32 determines whether or not it is necessary to call attention to the user 1 on the basis of an analysis result of the captured image.

For example, in a case where the captured image includes a moving object approaching the user 1, an unsafe area, and/or other objects to which a pedestrian should pay attention, the image analysis device 32 may determine that it is necessary to call attention to the user 1. On the other hand, in a case where the captured image does not include an object to which the pedestrian should pay attention, the image analysis device 32 may determine that it is unnecessary to call attention to the user 1.

The image analysis device 32 transmits a notification instruction signal D12 to the notification unit 26 according to whether or not it is necessary to call attention to the user 1.

For example, in a case of determining that it is necessary to call attention to the user 1, the image analysis device 32 transmits the notification instruction signal D12 indicating the determination to the notification unit 26. On the other hand, in a case where the image analysis device 32 determines that it is unnecessary to call attention to the user 1, the notification instruction signal D12 indicating the determination may be transmitted to the notification unit 26, or the notification instruction signal D12 itself may not be transmitted to the notification unit 26.

As described above, the image analysis device 32 may transmit the notification instruction signal D12 to the notification unit 26 in both cases where it is necessary and unnecessary to call attention to the user 1. Alternatively, the image analysis device 32 may transmit the notification instruction signal D12 to the notification unit 26 only in a case where it is necessary to call attention to the user 1.

The notification unit 26 notifies the user 1 according to the state of the surrounding environment with respect to the user 1 on the basis of the notification instruction signal D12 transmitted from the image analysis device 32.

The notification unit 26 of the present example includes an audio device, a vibration device, and/or a video device. For example, in a case where the notification unit 26 receives the notification instruction signal D12 that is transmitted in a case where it is necessary to call attention to the user 1, the notification unit issues a notification (audio, vibration and/or video) for calling attention of the user 1 to the user 1. On the other hand, in a case where the notification unit 26 receives the notification instruction signal D12 that is transmitted in a case where it is unnecessary to call attention to the user 1, the notification unit may not issue a notification to the user 1, or may issue, to the user 1, a notification indicating that it is unnecessary to call attention to the user 1. In addition, the notification unit 26 may not issue a notification to the user 1 while not receiving the notification instruction signal D12 from the image analysis device 32.

As described above, with the environmental state notification device 10 of the present example, it is possible to notify the user 1 of the presence of an object requiring attention in the surrounding environment on the basis of the captured image data acquired by the imaging device 31 included in the wearable device 11. The user 1 can grasp the state of the surrounding environment with respect to the user 1 on the basis of such a notification, and can take an appropriate action as necessary.

As described above, the environmental state notification device 10 of the present example is configured as a pedestrian safety protection device that improves the safety of the pedestrian (user 1).

Figure 4:
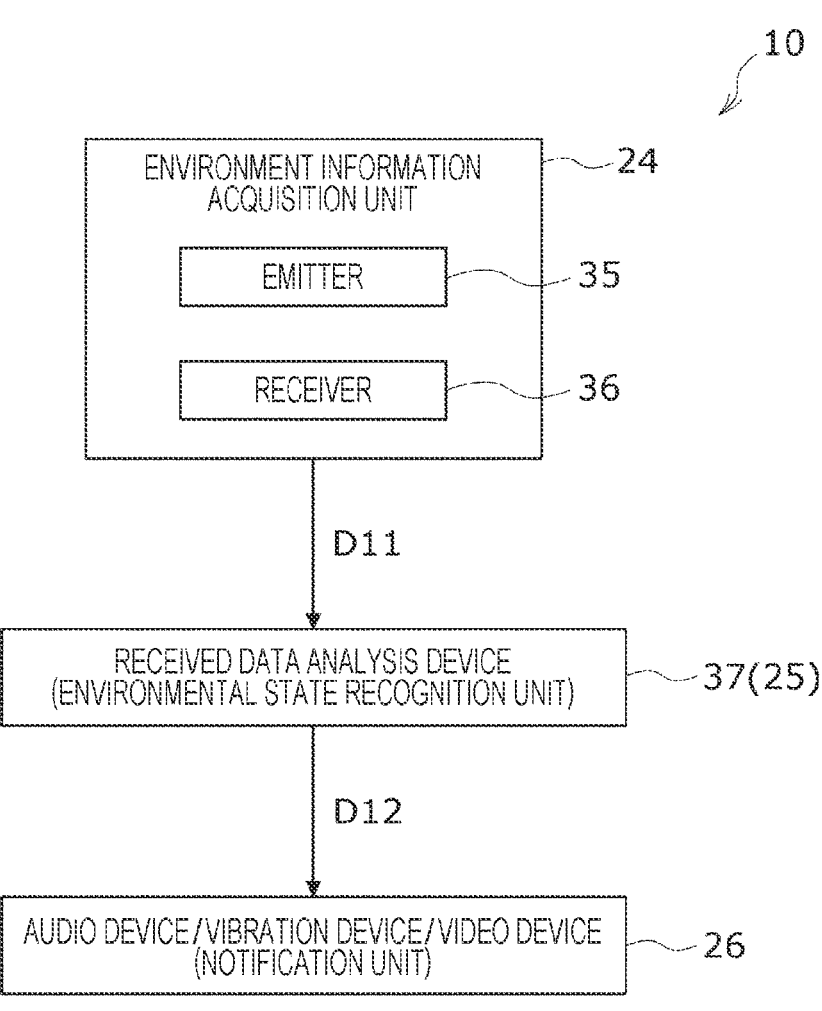
FIG. 4 is a diagram illustrating another example of the functional configuration of the environmental state notification device.

FIG. 4 is a diagram illustrating another example of the functional configuration of the environmental state notification device 10.

In the example illustrated in FIG. 4, the environment information acquisition unit 24 includes an emitter (emission unit) 35 that emits a detection electromagnetic wave or a detection sound wave, and a receiver (wave sensor) 36 that receives the reflected detection electromagnetic wave or the detection sound wave.

The detection electromagnetic wave may be light or radio waves.

For example, in a case where the emitter 35 and the receiver 36 are configured as LiDAR or ToF, the emitter 35 emits light toward the surrounding environment as a detection electromagnetic wave, and the receiver 36 receives the light reflected in the surrounding environment.

On the other hand, in a case where the emitter 35 and the receiver 36 are configured as millimeter wave radars, the emitter 35 emits a radio wave in a millimeter wave band as a detection electromagnetic wave toward the surrounding environment, and the receiver 36 receives the radio wave reflected in the surrounding environment.

The environment information acquisition unit 24 transmits surrounding environment information based on a reflection detection electromagnetic wave or a reflection detection sound wave received by the receiver 36 to the environmental state recognition unit 25 as environment information data D11.

The environmental state recognition unit 25 includes a received data analysis device 37. The received data analysis device 37 recognizes the "state of the surrounding environment with respect to the user 1" by analyzing the surrounding environment information based on a detection result (reflection detection electromagnetic wave or reflection detection sound wave) of the receiver 36 transmitted from the environment information acquisition unit 24. Then, the received data analysis device 37 determines whether or not it is necessary to call attention to the user 1 on the basis of an analysis result of the surrounding environment information.

Note that the received data analysis device 37 can recognize an object similar to the recognition target of the image analysis device 32 (see FIG. 3) described above, and can determine whether or not it is necessary to call attention to the user 1 according to a standard similar to the standard of the image analysis device 32. For example, the received data analysis device 37 may perform self-position estimation and environmental map creation using a technology such as SLAM on the basis of the detection result of the receiver 36.

The received data analysis device 37 transmits the notification instruction signal D12 to the notification unit 26 according to whether or not it is necessary to call attention to the user 1. The notification unit 26 notifies the user 1 according to the state of the surrounding environment with respect to the user on the basis of the notification instruction signal D12 transmitted from the received data analysis device 37.

As described above, with the environmental state notification device 10 of the present example, it is possible to notify the user 1 of the presence of an object requiring attention in the surrounding environment on the basis of the surrounding environment information acquired by the emitter 35 and the receiver 36.

FIG. 5 is a diagram illustrating another example of the functional configuration of the environmental state notification device 10.

In the example illustrated in FIG. 5, the environment information acquisition unit 24 includes a position information acquisition unit 40 and a map information collation unit 41.

The position information acquisition unit 40 acquires position information of the user 1. The position information acquisition unit 40 can acquire the position information of the user 1 (strictly, the wearable device 11) from, for example, a global navigation satellite system (GNSS) 42. The position information acquisition unit 40 may acquire the position information of the user 1 by means other than the GNSS 42, and may acquire the position information of the user 1 via a beacon, for example.

The map information collation unit 41 acquires the environment information data D11 on the basis of the position information of the user 1 and the map information acquired by the position information acquisition unit 40. The map information collation unit 41 of the present example acquires map information from a map information providing device 43.

The map information providing device 43 may be provided as a part of the wearable device 11 or may be provided separately from the wearable device 11. For example, the map information collation unit 41 may read the map information from the memory 23 (see FIG. 2) of the wearable device 11 that serves as the map information providing device 43. Alternatively, the map information may be transmitted from the map information providing device 43 (for example, a server) connected to the wearable device 11 to the map information collation unit 41 via a network such as the Internet.

The map information collation unit 41 may acquire, from the map information providing device 43, map information of a limited range determined on the basis of the position information of the user 1 acquired by the position information acquisition unit 40, for example. The map information collation unit 41 may transmit information (for example, the position information of the user 1) necessary for acquiring the map information of such a limited range to the map information providing device 43. The map information providing device 43 may transmit the map information of the limited range to the map information collation unit 41 on the basis of the information transmitted from the map information collation unit 41.

The map information acquired by the map information collation unit 41 may be a three-dimensional high-precision map, for example, a high-precision map such as a dynamic map, a point cloud map, or a vector map. As described later, the dynamic map is, for example, a map including four layers of dynamic information, semi-dynamic information, semi-static information, and static information. The point cloud map is a map including point clouds (point cloud data). The vector map is, for example, a map in which traffic information such as a lane and a position of a traffic light is associated with the point cloud map.

The point cloud map and the vector map may be provided from an external device such as a server, or may be created by the wearable device 11 (for example, the environment information acquisition unit 24 or the environmental state recognition unit 25) on the basis of the environment information data acquired by the environment information acquisition unit 24.

The environment information acquisition unit 24 transmits the environment information data D11 acquired in this manner (for example, information data in which the position of the user 1 is reflected on the map information) to the environmental state recognition unit 25.

The environmental state recognition unit 25 includes a position information analysis device 44 that analyzes the environment information data D11 transmitted from the environment information acquisition unit 24.

The position information analysis device 44 recognizes the "state of the surrounding environment with respect to the user 1" by analyzing the environment information data D11 based on the position information of the user 1 and the map information. As an example, recognition as to whether or not the user 1 is located in an area requiring attention (for example, a roadway or a vicinity of a roadway) can be included in the recognition of the "state of the surrounding environment with respect to the user 1" referred to herein.

Then, the position information analysis device 44 determines whether or not it is necessary to call attention to the user 1 on the basis of an analysis result of the environment information data D11.

For example, in a case where the user 1 is located in the area requiring attention, the position information analysis device 44 may determine that it is necessary to call attention to the user 1. On the other hand, in a case where the user 1 is not located in the area requiring attention, the position information analysis device 44 may determine that it is unnecessary to call attention to the user 1.

The position information analysis device 44 transmits the notification instruction signal D12 to the notification unit 26 according to whether or not it is necessary to call attention to the user 1.

The notification unit 26 notifies the user 1 according to the state of the surrounding environment with respect to the user on the basis of the notification instruction signal D12 transmitted from the received data analysis device 37.

As described above, with the environmental state notification device 10 of the present example, it is possible to notify the user 1 of the presence of an object requiring attention in the surrounding environment on the basis of the position information and the map information of the user 1.

Figure 6:
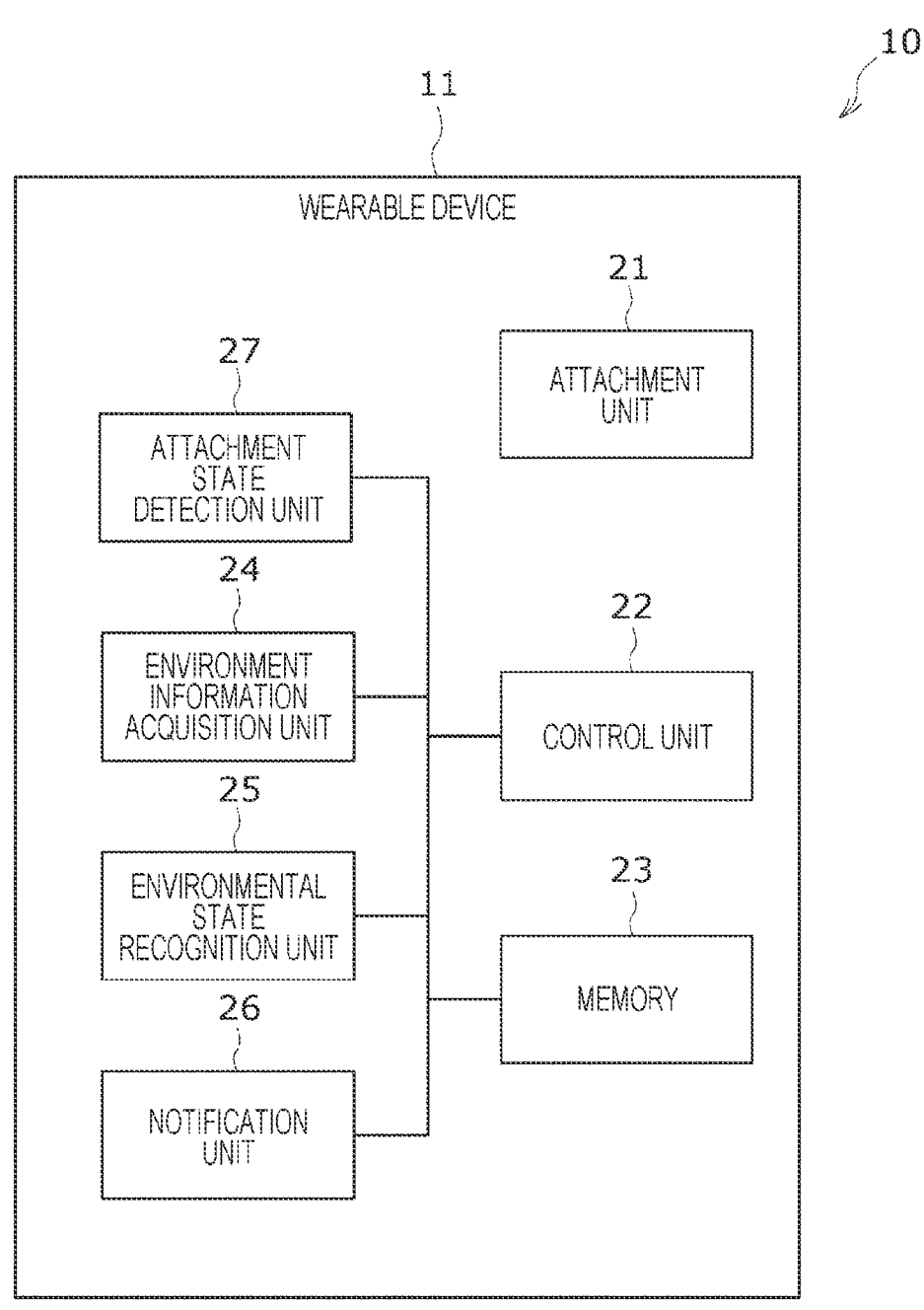
FIG. 6 is a diagram illustrating another example of the functional configuration of the wearable device.

FIG. 6 is a diagram illustrating another example of the functional configuration of the wearable device 11.

The wearable device 11 illustrated in FIG. 6 includes an attachment state detection unit 27 in addition to the attachment unit 21, the control unit 22, the memory 23, the environment information acquisition unit 24, the environmental state recognition unit 25, and the notification unit 26 described above.

The attachment state detection unit 27 detects the attachment state of the environment information acquisition unit 24 to the user 1 under the control of the control unit 22. That is, the attachment state detection unit 27 can detect the attachment state of the environment information acquisition unit 24 on the basis of the environment information data acquired by the environment information acquisition unit 24 and/or the state of the surrounding environment with respect to the user 1 recognized by the environmental state recognition unit 25.

In a case where the environment information data acquired by the environment information acquisition unit 24 is included in a data range assumed at the normal time, the attachment state detection unit 27 may detect that the environment information acquisition unit 24 is appropriately attached to the user 1. On the other hand, in a case where the environment information data acquired by the environment information acquisition unit 24 is not included in the data range assumed at the normal time, the attachment state detection unit 27 may detect that the environment information acquisition unit 24 is not appropriately attached to the user 1.

Similarly, in a case where the state of the surrounding environment with respect to the user 1 recognized by the environmental state recognition unit 25 is included in the data range assumed at the normal time, the attachment state detection unit 27 may detect that the environment information acquisition unit 24 is appropriately attached to the user 1. On the other hand, in a case where the state of the surrounding environment with respect to the user 1 recognized by the environmental state recognition unit 25 is not included in the data range assumed at the normal time, the attachment state detection unit 27 may detect that the environment information acquisition unit 24 is not appropriately attached to the user 1.

The attachment state detection unit 27 may further detect a type (kind) of defective attachment on the basis of the environment information data acquired by the environment information acquisition unit 24 and/or the state of the surrounding environment with respect to the user 1 recognized by the environmental state recognition unit 25.

For example, the attachment state detection unit 27 may detect a defect in the installation position of the environment information acquisition unit 24. That is, in a case where data obtained from the environment information acquisition unit 24 and the environmental state recognition unit 25 indicates that the installation position of the environment information acquisition unit 24 is inappropriate for acquiring the environment information data, the attachment state detection unit 27 can detect a defect of the installation position of the environment information acquisition unit 24.

As an example, in a case where the data obtained from the environment information acquisition unit 24 and the environmental state recognition unit 25 indicates that the environment information acquisition unit 24 (for example, a sensor) is blocked and inappropriate for acquisition of the environment information data, a defect in the installation position of the environment information acquisition unit 24 may be detected.

As another example, in a case where the data obtained from the environment information acquisition unit 24 and the environmental state recognition unit 25 indicates that the detection direction (orientation) by the environment information acquisition unit 24 (for example, a sensor) is inappropriate, a defect in the installation position of the environment information acquisition unit 24 may be detected. For example, in a case where the environment information acquisition unit 24 originally sets the surrounding environment in front of the user 1 as a detection object and actually sets the surrounding environment behind the user 1 as a detection object, a defect in the installation position of the environment information acquisition unit 24 may be detected.

Whether or not the detection direction of the environment information acquisition unit 24 is inappropriate may be detected on the basis of, for example, information indicating the progress status of the user 1 derived from the environment information data D11 (image or the like) acquired by the environment information acquisition unit 24.

The notification unit 26 notifies the user 1 according to the detection result of the attachment state detection unit 27.

That is, in a case where the attachment state detection unit 27 detects that the attachment state of the environment information acquisition unit 24 is inappropriate, the notification unit 26 issues a notification indicating that the attachment state of the environment information acquisition unit 24 is inappropriate to the user 1. On the other hand, in a case where the attachment state detection unit 27 detects that the attachment state of the environment information acquisition unit 24 is appropriate, the notification unit 26 may issue a notification indicating that the attachment state of the environment information acquisition unit 24 is appropriate to the user 1, or may not issue the notification itself.

As described above, with the environmental state notification device 10 of the present example, it is possible to notify the user 1 of the attachment state of the environment information acquisition unit 24 to the user 1, whereby it is possible to promote appropriate attachment of the environment information acquisition unit 24 to the user 1.

Figure 7:
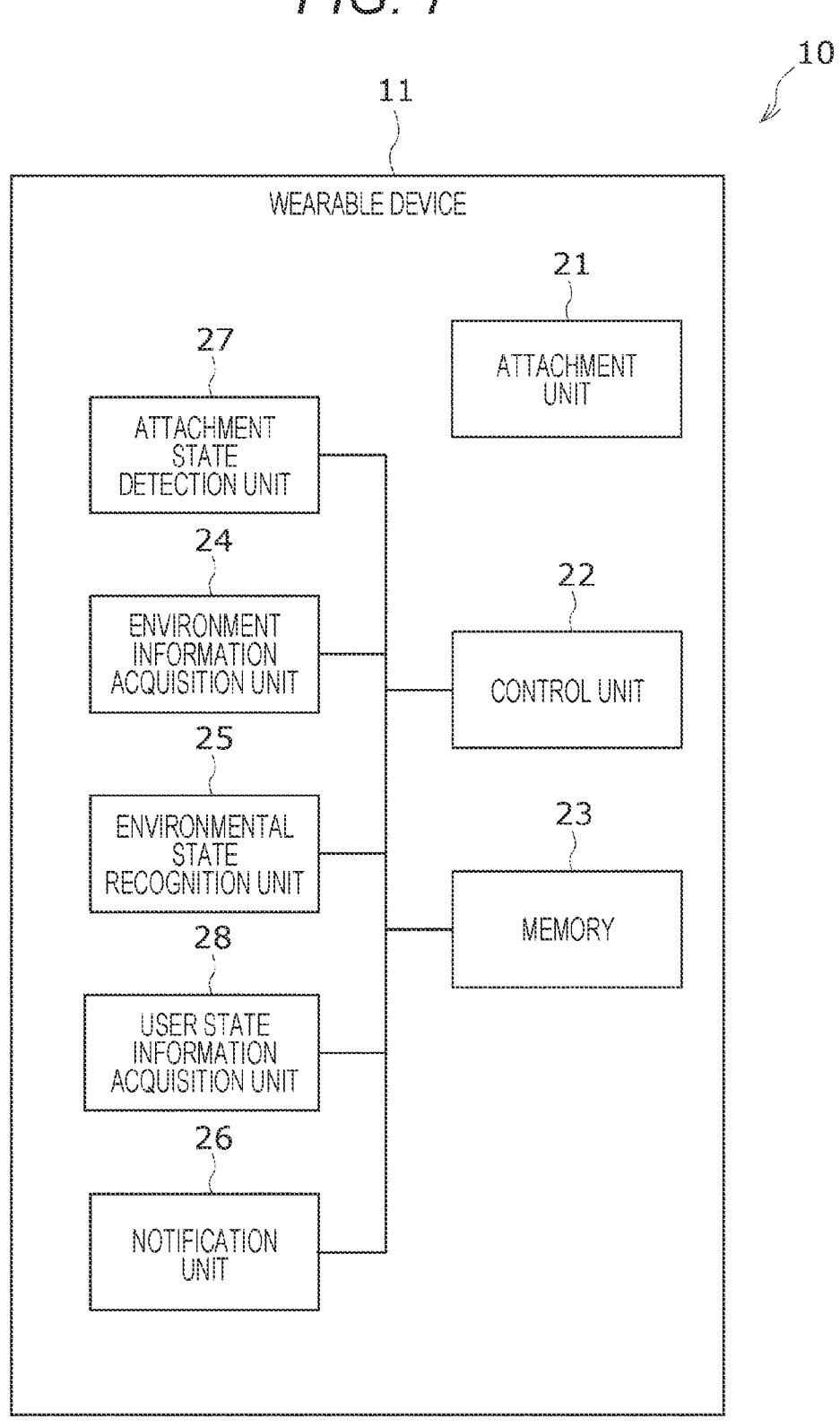
FIG. 7 is a diagram illustrating another example of the functional configuration of the wearable device.

FIG. 7 is a diagram illustrating another example of the functional configuration of the wearable device 11.

The wearable device 11 illustrated in FIG. 7 includes a user state information acquisition unit 28 in addition to the attachment unit 21, the control unit 22, the memory 23, the environment information acquisition unit 24, the environmental state recognition unit 25, the notification unit 26, and the attachment state detection unit 27 described above.

The user state information acquisition unit 28 acquires user state data indicating information regarding the state of the user 1.

Specific information included in the user state data is not limited, but includes information regarding the state of the user 1 that can affect the state of the surrounding environment with respect to the user 1. As an example, information regarding the speed and/or acceleration of movement of the user 1 may be included in the user state data.

Therefore, the user state information acquisition unit 28 may include a sensor that detects at least one of the speed or the acceleration of the movement of the user 1. The sensor included in the user state information acquisition unit 28 is not limited. For example, the user state information acquisition unit 28 may include a speed sensor, an acceleration sensor, an angular velocity sensor (gyro sensor), and an inertial measurement unit (IMU) as an integrated sensor including these sensors. In addition, the user state information acquisition unit 28 may include a functional component (see, for example, the position information acquisition unit 40 and the map information collation unit 41 illustrated in FIG. 5) that acquires other information indicating the movement of the user 1.

The environmental state recognition unit 25 recognizes the state of the surrounding environment with respect to the user 1 on the basis of the environment information data acquired by the environment information acquisition unit 24 and the user state data acquired by the user state information acquisition unit 28.

As an example, the environmental state recognition unit 25 may predict a movement course of the user 1 on the basis of the user state data, and recognize the state of the surrounding environment with respect to the user 1 on the basis of the predicted movement course of the user 1 and the environment information data. For example, the environmental state recognition unit 25 can recognize whether or not the predicted movement course of the user 1 approaches or passes through an area or an object requiring attention of the user 1.

As described above, the environmental state recognition unit 25 can recognize not only whether or not the current situation of the user 1 is a situation in which the safety of the user 1 can be threatened, but also whether or not a predicted future situation of the user 1 is a situation in which the safety of the user 1 can be threatened.

The notification unit 26 notifies the user 1 according to the "state of the surrounding environment with respect to the user 1" recognized by the environmental state recognition unit 25.

As described above, with the environmental state notification device 10 of the present example, it is possible to notify the user 1 of the presence of an object requiring attention in the surrounding environment at present and/or in the future on the basis of the user state data.

Figure 8:
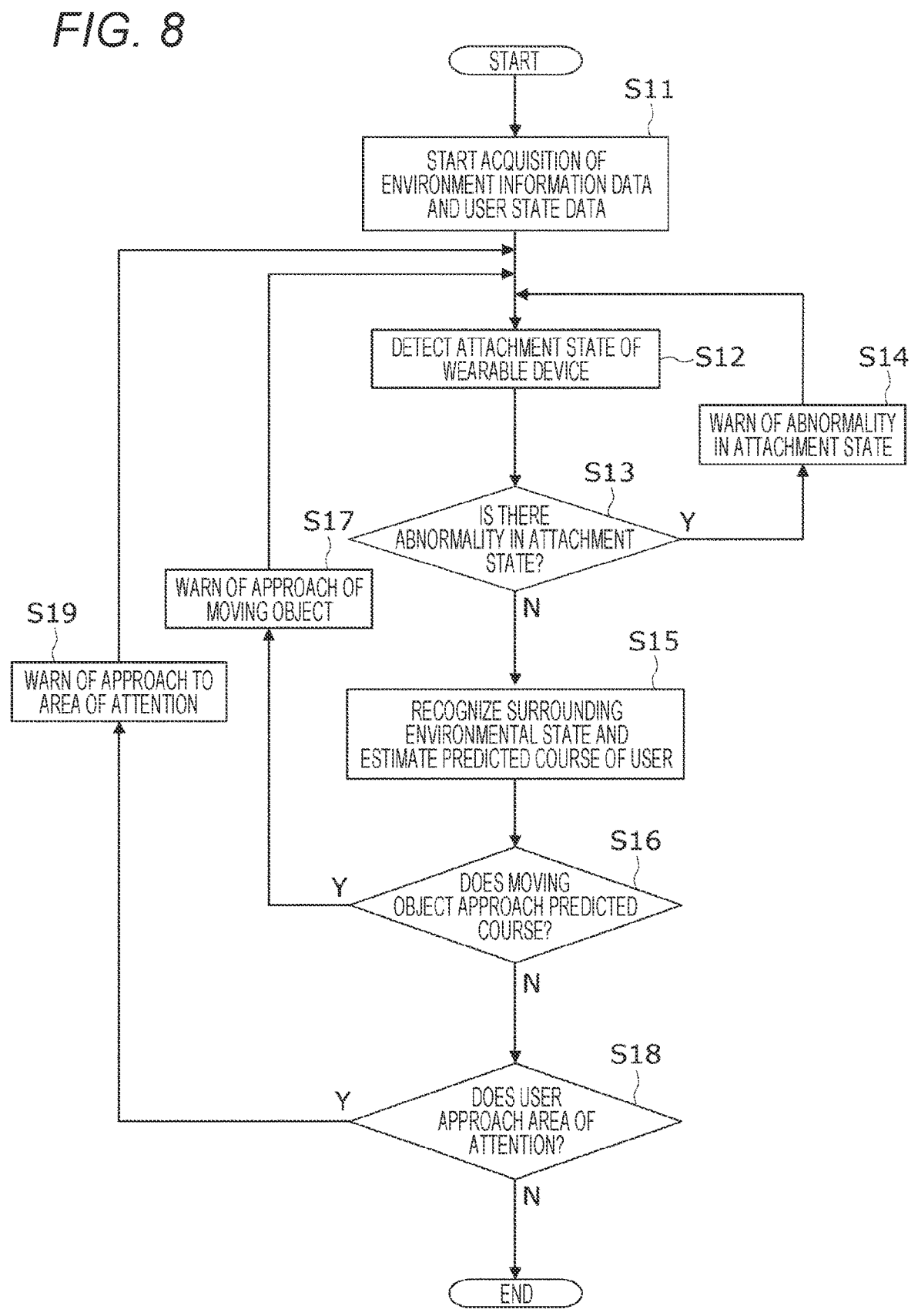
FIG. 8 is a flowchart illustrating an example of an environmental state notification method.

FIG. 8 is a flowchart illustrating an example of an environmental state notification method.

In the example illustrated in FIG. 8, first, the environment information acquisition unit 24 starts acquisition of the environment information data indicating information of the surrounding environment of the user 1, and the user state information acquisition unit 28 starts acquisition of the user state data indicating the state of the user 1 (S11 in FIG. 8).

Then, the attachment state of the wearable device 11 including the environment information acquisition unit 24 is detected by the attachment state detection unit 27 (S12). Specifically, the attachment state detection unit 27 determines whether or not the installation position of the wearable device 11 (in particular, the environment information acquisition unit 24) is appropriate (S13).

In a case where an abnormality is detected in the attachment state of the wearable device 11 including the environment information acquisition unit 24 (Y in S13), a warning for notifying the user 1 of the abnormality in the attachment state of the wearable device 11 including the environment information acquisition unit 24 is issued from the notification unit 26 (S14).

A specific method of the warning issued from the notification unit 26 at this time is not limited. For example, like the notification to the user 1 described above, the notification unit 26 can issue a warning to the user 1 through sound, video, and/or vibration.

Thus, the user 1 can notice an inappropriate state in which the wearable device 11 (in particular, the environment information acquisition unit 24) is hidden by the body or clothing, an inappropriate direction of the environment information acquisition unit 24, an inappropriate wearing position of the wearable device 11, or the like.

After the warning regarding the abnormality of the attachment state of the wearable device 11 including the environment information acquisition unit 24 is issued from the notification unit 26, the above-described steps S12 and S13 are repeated.

On the other hand, in a case where no abnormality is detected in the attachment state of the wearable device 11 including the environment information acquisition unit 24 (N in S13), the environmental state notification device 10 proceeds to the next step (that is, S15).

As described above, the user 1 is urged to normally attach the wearable device 11, and the environmental state notification device 10 does not proceed to the next step S15 until the wearable device 11 is appropriately attached to the user 1.

In step S15, the environmental state recognition unit 25 recognizes the state of the surrounding environment with respect to the user 1 on the basis of the environment information data and the user state data.

In the present example, the environmental state recognition unit 25 recognizes the state of the surrounding environment of the user 1 and estimates a predicted course of the user 1 on the basis of the environment information data and the user state data. More specifically, information (including position information) regarding movement of a moving object such as a vehicle and information regarding an area requiring attention in the surrounding environment are acquired as the environment information data. However, any other information may be included in the environment information data.

Then, the environmental state recognition unit 25 determines whether or not the moving object approaches the predicted course of the user 1 (for example, a predicted position of the user 1) (S16).

In a case where it is determined that the moving object approaches the predicted course of the user 1 (the predicted position of the user 1) (Y in S16), the notification unit 26 issues a notification for warning the user 1 about the approach of the moving object (S17). Thus, the user 1 can recognize the approach of the moving object and take an action as necessary.

After the warning of the approach of the moving object is issued from the notification unit 26 to the user 1, the detection and determination (S12 and S13) of the attachment state of the wearable device 11 to the user 1 are performed again in this example. Note that, after the warning of the approach of the moving object is issued from the notification unit 26 to the user 1, the recognition of the surrounding environmental state and the estimation of the predicted course of the user (S15) may be performed again without detecting and determining the attachment state of the wearable device 11.

On the other hand, In a case where it is determined that the moving object does not approach the predicted course of the user 1 (the predicted position of the user 1) (N in S16), the environmental state recognition unit 25 determines whether or not the user 1 approaches the area requiring attention (S18).

In a case where it is determined that the user 1 approaches the area requiring attention (Y in S18), the notification unit 26 issues a notification for warning about the approach of the user 1 to the area requiring attention to the user 1 (S19).

After the warning about approach to the area requiring attention is issued from the notification unit 26 to the user 1, the environmental state notification device 10 of the present example returns to the above-described step S12. However, the environmental state notification device 10 may return to step S15 without returning to step S12.

On the other hand, In a case where it is determined that the user 1 does not approach the area requiring attention (N in S18), the notification unit 26 does not issue the notification to the user 1.

As described above, the notification unit 26 notifies the user 1 according to the state of the surrounding environment with respect to the user 1 recognized by the environmental state recognition unit 25.

The above-described series of processing (S11 to S19) may be repeatedly performed. In addition, some processes (for example, S12 to S19 or S15 to S19) of the above-described series of processes may be repeatedly performed.

Note that some functional components included in the above-described example of the wearable device 11 may be provided separately from the wearable device 11.

Figure 9:
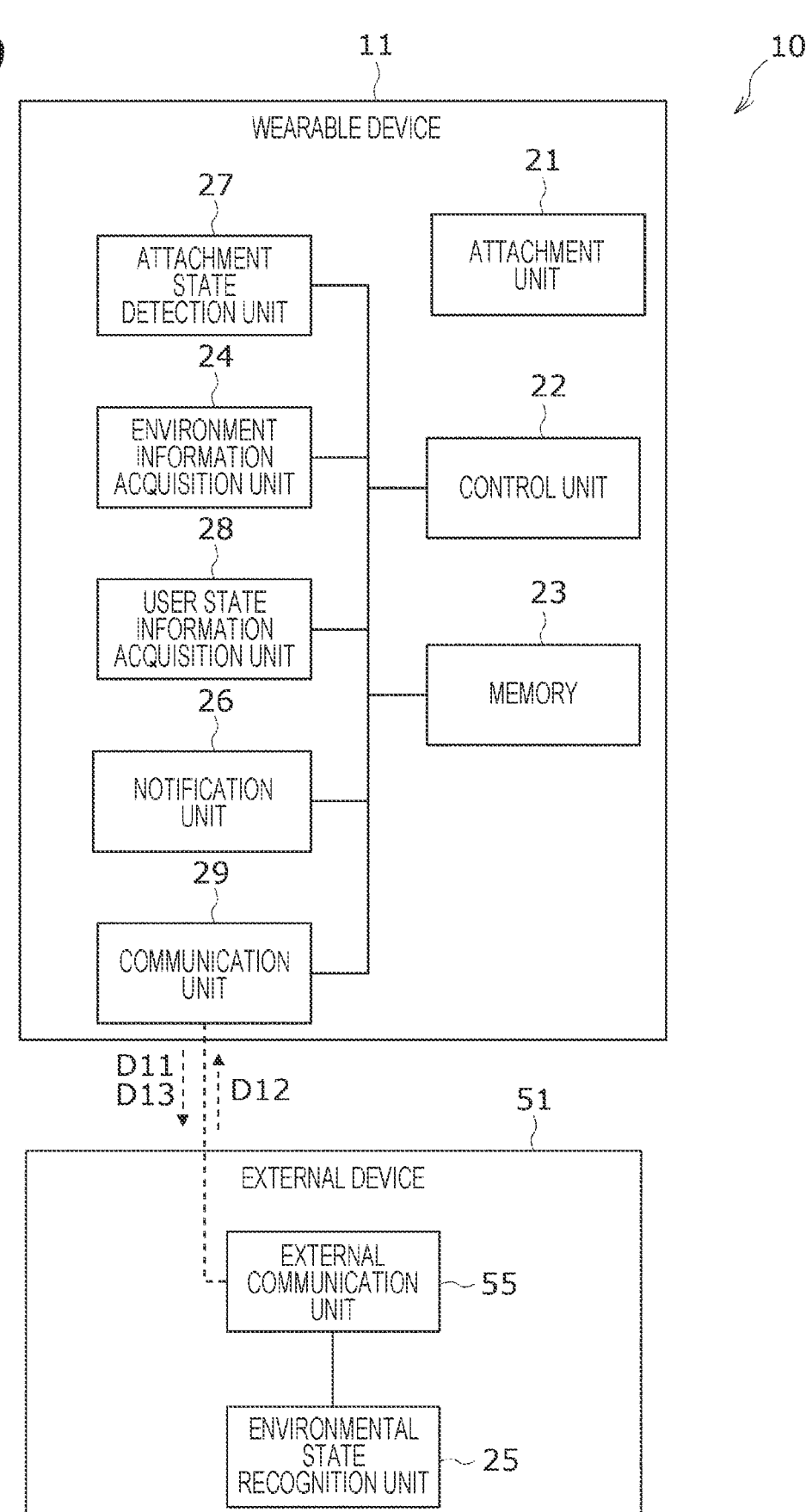
FIG. 9 is a diagram illustrating another example of the functional configuration of the environmental state notification device.

FIG. 9 is a diagram illustrating another example of the functional configuration of the environmental state notification device 10.

In the example illustrated in FIG. 9, the wearable device 11 does not include the environmental state recognition unit 25 but includes a communication unit 29.

The communication unit 29 communicates data with an external communication unit 55 of an external device 51. The external device 51 includes the environmental state recognition unit 25 in addition to the external communication unit 55.

A communication method between the communication unit 29 and the external communication unit 55 is not limited. Furthermore, communication may be performed between the communication unit 29 and the external communication unit 55 by using a plurality of communication methods conforming to two or more communication standards.

The communication unit 29 can communicate with the external communication unit 55 on the basis of, for example, a wireless communication system such as 5th generation mobile communication system (5G), long term evolution (LTE), or dedicated short range communications (DSRC). Examples of the external network with which the communication unit 29 performs communication include the Internet, a cloud network, a company-specific network, and the like. The communication scheme by which the communication unit 29 communicates with the external network is not particularly limited as long as it is a wireless communication scheme allowing digital bidirectional communication at a communication speed equal to or higher than a predetermined speed and over a distance equal to or longer than a predetermined distance.

The communication unit 29 can communicate with a communication device existing in the vicinity of the communication unit 29 (that is, the wearable device 11) using a peer to peer (P2P) technology. Examples of the communication device existing in the vicinity of the wearable device 11 include a communication device mounted on a moving object such as a vehicle or a bicycle, a communication device whose arrangement is fixed in a store or the like and which does not move, and a machine type communication (MTC) terminal.

For example, the communication unit 29 may receive an electromagnetic wave transmitted by a road traffic information communication system (vehicle information and communication system (VICS) (registered trademark)), such as a radio wave beacon, an optical beacon, or FM multiplex broadcasting.

Furthermore, the communication unit 29 and the external communication unit 55 may be directly connected via wireless communication that assumes communication at a relatively short distance, such as near field communication (NFC) or Bluetooth (registered trademark).

Other configurations of the wearable device 11 of the present example are the same as those of the wearable device 11 illustrated in FIG. 7 described above.

In the present example, the environment information data D11 acquired by the environment information acquisition unit 24 and the user state data D13 acquired by the user state information acquisition unit 28 are transmitted to the environmental state recognition unit 25 via the communication unit 29 and the external communication unit 55.

The environmental state recognition unit 25 recognizes the state of the surrounding environment with respect to the user 1 on the basis of the transmitted environment information data D11 and user state data D13.

Then, the environmental state recognition unit 25 transmits the notification instruction signal D12 corresponding to the recognized state of the surrounding environment with respect to the user 1 to the notification unit 26 via the external communication unit 55 and the communication unit 29.

The notification unit 26 notifies the user 1 according to the transmitted notification instruction signal D12. Note that the notification instruction signal D12 may be directly transmitted from the external device 51 to the notification unit 26 via the communication unit 29, or may be transmitted to the notification unit 26 via another functional component (for example, the control unit 22) of the wearable device 11.

Figure 10:
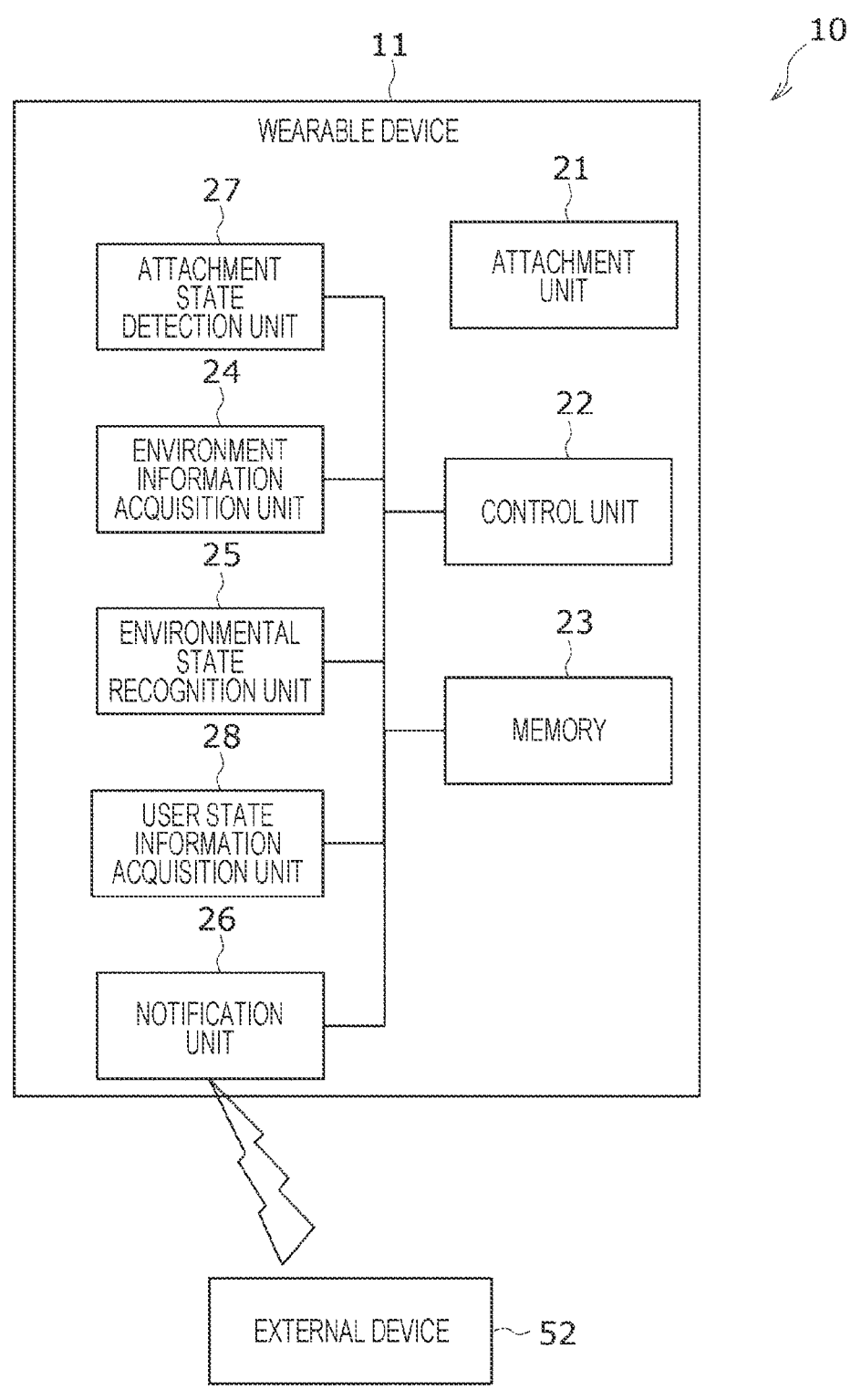
FIG. 10 is a diagram illustrating another example of the functional configuration of the environmental state notification device.

FIG. 10 is a diagram illustrating another example of the functional configuration of the environmental state notification device 10.

The configuration of the wearable device 11 illustrated in FIG. 10 is basically the same as that of the wearable device 11 illustrated in FIG. 7 described above.

However, the notification unit 26 of the present example notifies the external device 52 (second external device) that exists in the surrounding environment of the user 1 and is not attached to the user 1 according to the state of the surrounding environment with respect to the user 1 recognized by the environmental state recognition unit 25.

The external device 52 is typically a moving object (including a passenger) such as a vehicle, but is not limited thereto.

A notification method from the notification unit 26 to the external device 52 is not limited. The notification unit 26 can issue a notification to the external device 52, for example, by emitting sound or light (for example, warning sound or warning light).

Furthermore, the notification unit 26 may transmit a notification signal to the external device 52 via a communication unit (not illustrated in FIG. 10) of the wearable device 11. In a case where the external device 52 is a moving object such as a vehicle, the network between the notification unit 26 and the external device 52 can include, for example, a controller area network (CAN), a local interconnect network (LIN), or a local area network (LAN). Furthermore, such a network can include a network such as an in-vehicle communication network or a bus conforming to FlexRay (registered trademark), Ethernet (registered trademark), or a digital bidirectional communication standard.

The notification signal transmitted from the notification unit 26 to the external device 52 may include any information. For example, the warning information, the position information of the user 1, the environment information data, the user state data, and/or the map information may be transmitted from the notification unit 26 to the external device 52.

With the wearable device 11 (the environmental state notification device 10) of the present example, since the notification unit 26 notifies both the user 1 and the external device 52, the safety of the user 1 is further improved.

FIG. 11 is a diagram illustrating another example of the functional configuration of the environmental state notification device 10.

The wearable device 11 illustrated in FIG. 11 includes the communication unit 29 that communicates data with an external device (third external device) 53.

Other configurations of the wearable device 11 of the present example are the same as those of the wearable device 11 illustrated in FIG. 7 described above.

The communication unit 29 of the present example transmits surrounding environmental state data D14 indicating the state of the surrounding environment with respect to the user 1 recognized by the environmental state recognition unit 25 to the external device 53. Thus, the external device 53 can grasp the state of the surrounding environment with respect to the user 1.

The external device 53 is not limited. For example, the external device 53 can be configured as a mobile terminal held by a guardian of the user 1 and/or a terminal device held by a company (for example, an insurance company or a security company). In this case, the guardian or the company can be informed of the state of the surrounding environment with respect to the user 1, and the safety of the user 1 is further improved.

FIG. 12 is a diagram illustrating another example of the functional configuration of the environmental state notification device 10.

The configuration of the wearable device 11 illustrated in FIG. 12 is basically the same as that of the wearable device 11 illustrated in FIG. 11 described above.

However, the communication unit 29 of this example communicates data with the external device (first external device) 54, and receives the environment information data D11 and/or the user state data D13 transmitted from the external device 54.

For example, in a case where the external device 54 is a moving object such as a vehicle located near the user 1, the external device 54 may transmit information regarding an attribute of the moving object to the communication unit 29 as the environment information data D11. The attribute of the moving body mentioned here can correspond to, for example, information regarding whether or not the external device 54 is a moving object including a safety support device capable of recognizing the user 1, and other information that can be provided by the external device 54.

The environmental state recognition unit 25 recognizes the state of the surrounding environment with respect to the user 1 on the basis of the environment information data acquired by the environment information acquisition unit 24 and the environment information data and/or the user state data transmitted from the external device 54 via the communication unit 29.

As described above, with the environmental state notification device 10 of the present example, the state of the surrounding environment with respect to the user 1 can be recognized on the basis of the environment information data acquired by the wearable device 11 and the external device 54. Furthermore, the state of the surrounding environment with respect to the user 1 can be recognized on the basis of the environment information data and the user state data acquired by the wearable device 11 and the user state data acquired by the external device 54. Thus, it is possible to more accurately recognize the state of the surrounding environment with respect to the user 1, and the safety of the user 1 is further improved.

Figure 13:
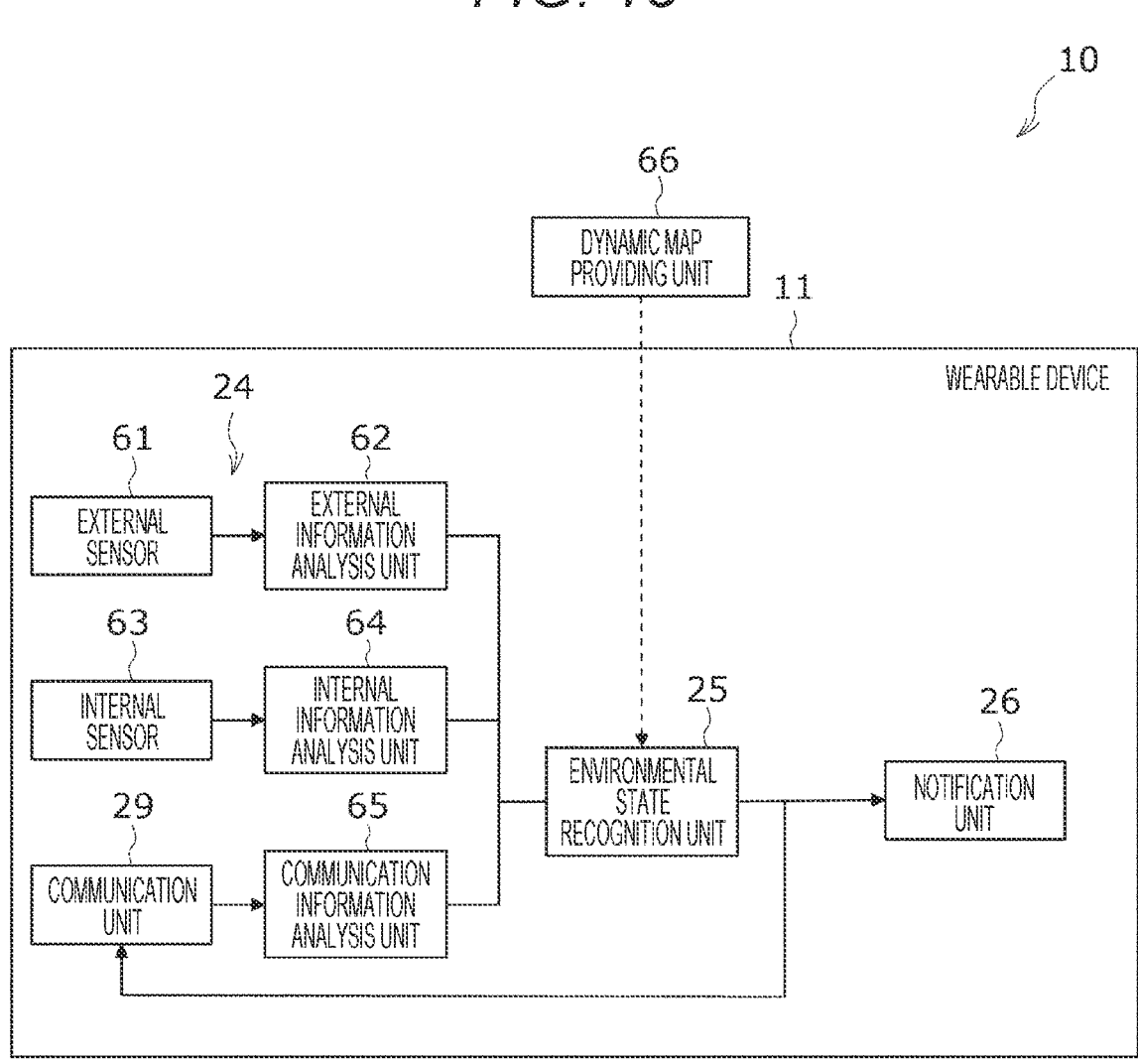
FIG. 13 is a diagram illustrating another example of the functional configuration of the environmental state notification device.

FIG. 13 is a diagram illustrating another example of the functional configuration of the environmental state notification device 10.

Although the attachment unit 21, the control unit 22, and the memory 23 are not illustrated in FIG. 13, the wearable device 11 illustrated in FIG. 13 includes the attachment unit 21, the control unit 22, and the memory 23.

The wearable device 11 of the present example includes an external sensor 61 and an internal sensor 63.

The external sensor 61 detects the state of the surrounding environment of the user 1. Therefore, the external sensor 61 may include, for example, cameras, LiDAR, ToF, and/or millimeter wave radars.

The internal sensor 63 detects the state of the user 1. Therefore, the internal sensor 63 may include, for example, a GNSS and/or an IMU.

Data detected by the external sensor 61 is analyzed by an external information analysis unit 62, and information of the surrounding environment of the user 1 is acquired by the external information analysis unit 62. The information of the surrounding environment of the user 1 obtained in this manner is transmitted from the external information analysis unit 62 to the environmental state recognition unit 25.

On the other hand, data detected by the internal sensor 63 is analyzed by an internal information analysis unit 64, and information regarding the state of the user 1 is acquired by the internal information analysis unit 64. The internal information analysis unit 64 calculates the moving direction and/or the moving distance of the user 1 from the detection data of the internal sensor 63 on the basis of, for example, pedestrian dead reckoning (PDR), and can obtain information regarding the movement course of the user 1. The information regarding the state of the user 1 obtained in this manner is transmitted from the internal information analysis unit 64 to the environmental state recognition unit 25.

Information received by the communication unit 29 from a device outside the wearable device 11 is analyzed by a communication information analysis unit 65, and communication analysis information is acquired by the communication information analysis unit 65. The communication analysis information obtained in this manner is transmitted from the communication information analysis unit 65 to the environmental state recognition unit 25.

Note that, in a case where the information received by the communication unit 29 is information that does not require analysis, the communication unit 29 may transmit such information that does not require analysis to the environmental state recognition unit 25 via the communication information analysis unit 65, or may skip the communication information analysis unit 65 and transmit the information to the environmental state recognition unit 25.

An external device that communicates with the communication unit 29 is not limited. The communication unit 29 can communicate data with, for example, a server, an infrastructure facility (for example, a base station or an access point), and/or a moving object (for example, a vehicle control device). Furthermore, the information received by the communication unit 29 is not limited, and the communication unit 29 can receive, for example, map information, infrastructure information, vehicle information, and the like.

The communication information analysis unit 65 may transmit and receive data to and from the external information analysis unit 62 and the internal information analysis unit 64.

For example, the communication information analysis unit 65 may transmit map information received via the communication unit 29 to the internal information analysis unit 64. The internal information analysis unit 64 may acquire information regarding the state of the user 1 using, for example, a map matching technology based on map information received from the communication information analysis unit 65. Alternatively, a state regarding the state of the user 1 may be transmitted from the internal information analysis unit 64 to the communication information analysis unit 65, and the communication information analysis unit 65 may acquire the information regarding the state of the user 1 using the map matching technology. The highly accurate information regarding the state of the user 1 obtained in this manner is transmitted to the environmental state recognition unit 25.

The environmental state recognition unit 25 of the present example acquires the dynamic map of the surrounding environment of the user 1 from a dynamic map providing unit 66.

The dynamic map providing unit 66 is provided outside the wearable device 11 and can include, for example, a server.

The dynamic map is a database map including high-precision three-dimensional geospatial information (basic map information) and additional map information, and is sometimes referred to as a local dynamic map. The dynamic map typically includes a plurality of layers according to the update frequency of the information. For example, a static information data layer (Permanent static data), a semi-static information data layer (Transient static data), a semi-dynamic information data layer (Transient dynamic data), and a dynamic information data layer (Highly dynamic data) are included in the dynamic map.

The environmental state recognition unit 25 recognizes the state of the surrounding environment with respect to the user 1 on the basis of the environment information data, the user state data, and the dynamic map obtained as described above.

Then, the notification unit 26 notifies the user 1 according to the state of the surrounding environment with respect to the user 1 recognized by the environmental state recognition unit 25.

Note that the information regarding the state of the surrounding environment with respect to the user 1 recognized by the environmental state recognition unit 25 may be transmitted to an external device via the communication unit 29.

[Example of Notification Contents of Notification Unit]

As described above, the notification unit 26 notifies the user 1 according to the state of the surrounding environment with respect to the user 1 recognized by the environmental state recognition unit 25, but the notification content is not limited.

Typically, the notification unit 26 can notify the user 1 of the state of the surrounding environment.

For example, the notification unit 26 can notify the user 1 that a moving object such as a vehicle or a bicycle is approaching the user 1. Further, in a case where a moving object exhibiting behavior requiring attention is present near the user 1, the notification unit 26 can notify the user 1 of the presence of such a behavior suspicious moving object. Furthermore, the notification unit 26 can notify the user 1 of an attribute of a vehicle located near the user 1.

For example, in a case where the vehicle near the user 1 is a vehicle that can recognize a pedestrian on the side of the vehicle via a sensor or communication, the notification unit 26 may not notify the user 1. On the other hand, in a case where the vehicle near the user 1 is a vehicle (for example, a vehicle not equipped with the V2X communication device) that cannot recognize a pedestrian on the side of the vehicle via a sensor or communication, the notification unit 26 can notify the user 1 of the vehicle as a vehicle requiring attention.

Furthermore, in a case where a person exhibiting behavior requiring attention is present near the user 1, the notification unit 26 can notify the user 1 of the presence of such a suspicious behavior person. Note that, in this case, as illustrated in FIG. 11 described above, it is effective that information indicating the presence of a suspicious behavior person (that is, the surrounding environmental state data D14) is also transmitted to the external device 53.

As another typical example, the notification unit 26 can notify the user 1 of the "state of the surrounding environment with respect to the user 1" related to the behavior of the user 1.

For example, the notification unit 26 can notify the user 1 that the user 1 is approaching or entering an area requiring attention.

Such an area requiring attention may include, for example, not only an area inherently dangerous to the user 1 (for example, a roadway or the like) but also an area potentially dangerous to the user 1. For example, an area in which a utility pole or a high wall (fence) that easily creates a blind spot of the vehicle driver exists near the user 1 may correspond to an area that is potentially dangerous for the user 1.

Whether or not the user 1 approaches or enters the area requiring attention can be determined by the environmental state recognition unit 25 on the basis of the detection result of the sensor of the environment information acquisition unit 24. Furthermore, whether or not the user 1 is approaching or entering the area requiring attention can be determined by the environmental state recognition unit 25 on the basis of the map information acquired by the environment information acquisition unit 24 and the position information of the user 1.

Furthermore, the notification unit 26 can notify the user 1 that the user 1 violates the traffic rules. Whether or not the user 1 violates the traffic rules can be determined from a detection result of the sensor of the environment information acquisition unit 24.

For example, a signal is captured by the image sensor of the environment information acquisition unit 24, and the environmental state recognition unit 25 analyzes the captured image and grasps the state of the signal, whereby it is possible to determine whether or not the user 1 violates the traffic rules. Furthermore, the environmental state recognition unit 25 determines whether or not the place where the user 1 is located is a roadway on the basis of the detection result of the sensor of the environment information acquisition unit 24, whereby it is possible to determine whether or not the user 1 violates the traffic rules. Further, the environmental state recognition unit 25 determines whether or not the place where the user 1 is located is a roadway on the basis of the map information acquired by the environment information acquisition unit 24 and the position information of the user 1, whereby it is possible to determine whether or not the user 1 violates the traffic rules.

Furthermore, the notification unit 26 can notify the user 1 that the user 1 has not performed a sufficient safety confirmation action, such as a case where the user 1 does not temporarily stop when crossing the road.

Furthermore, the notification unit 26 can notify the user 1 that the user 1 is taking an action (for example, sudden acceleration, sudden deceleration, meandering, or the like) that is difficult for the vehicle driver to predict, for example.

Whether or not the user 1 is performing a sufficient safety confirmation action and whether or not the user 1 is performing an action that is difficult to predict can be determined on the basis of the detection result of the sensor of the environment information acquisition unit 24 and/or the detection result of the sensor of the user state information acquisition unit 28.

For example, it is possible to determine whether or not the user 1 is performing a sufficient safety confirmation action and whether or not the user 1 is performing an action that is difficult to predict on the basis of a detection result of a sensor that detects the speed and/or acceleration of the user 1. In addition, it is possible to determine whether or not the user 1 is performing a sufficient safety confirmation action and whether or not the user 1 is performing an action that is difficult to predict on the basis of the map information and the position information of the user 1 acquired by the environment information acquisition unit 24.

Furthermore, the notification unit 26 can notify the user 1 of an attachment state abnormality of the wearable device 11 (in particular, the environment information acquisition unit 24 and/or the user state information acquisition unit 28) with respect to the user 1.

For example, in a case where appropriate information cannot be acquired by the environment information acquisition unit 24 and/or the user state information acquisition unit 28, the notification unit 26 can provide notification of an attachment state abnormality of the wearable device 11. Furthermore, in a case where it is determined that the detection direction by the environment information acquisition unit 24 is inappropriate from the information acquired by the environment information acquisition unit 24 and/or the user state information acquisition unit 28, the notification unit 26 can provide notification of an attachment state abnormality of the wearable device 11.

[Stereophonic Sound Function]

In a case where the state of the surrounding environment with respect to the user 1 requires the user 1 to quickly grasp the state of the surrounding environment or the user 1 to take a quick avoidance action, it is desirable that the notification unit 26 promptly and intuitively notify the user 1.

In order to implement such quick and intuitive notification, the notification unit 26 can perform notification based on, for example, stereophonic sound technology.

The stereophonic sound technology is a technology for providing a three-dimensional sound effect to the user 1, and is, for example, a technology for reproducing a stereoscopic sound source in a pseudo manner. A specific method and device configuration for implementing the stereophonic sound technology are not limited, and for example, a technology and a device referred to as "360 REALITY AUDIO" (registered trademark) are also based on the stereophonic sound technology.

For example, in a case where the user 1 is about to be placed in an unsafe situation, in a case where the notification unit 26 notifies the user 1 by a simple alarm, the user 1 may not be able to instantly recognize the situation and take an appropriate action.

On the other hand, by the notification unit 26 notifying the user 1 by stereophonic sound, it is possible to prompt instantaneous situation recognition of the user 1 or induce a reflective action of the user 1, which is advantageous for improving safety of the user. Hereinafter, a specific example of the stereophonic sound function will be described.

[First Example of Stereophonic Sound Function (Enhanced Reality)]

The notification unit 26 may give directivity to the degree of emphasis of the notification sound (warning sound or the like) according to the state of the surrounding environment with respect to the user 1.

As an example, the notification unit 26 can notify the user 1 by using a sound emphasized in a direction from an object requiring attention (for example, a moving object such as a vehicle or an obstacle such as a utility pole) toward the user 1.

The notification unit 26 can notify the user 1 by acquiring a positional relationship between the object requiring attention and the user 1 and creating a stereophonic sound corresponding to the positional relationship. Furthermore, the notification unit 26 may change the loudness, tempo, and/or other characteristics of the emphasized sound provided to the user 1 according to the distance between the object requiring attention and the user 1.

The notification unit 26 may acquire the information regarding the positional relationship between the object requiring attention and the user 1 from the control unit 22 or an external device, or may derive the information on the basis of the environment information data and/or the user state data.

Note that, in a case where a notification sound (including the emphasized sound) provided from the notification unit 26 to the user 1 is determined by another functional component (for example, the control unit 22) other than the notification unit 26, the information regarding the positional relationship between the object requiring attention and the user 1 is sent to the another functional component. In this case, the information regarding the positional relationship between the object requiring attention and the user 1 may not be transmitted to the notification unit 26.

In the present example, the user 1 can quickly and intuitively grasp the positional relationship between the object requiring attention and the user 1 by listening to the sound (in particular, the emphasized sound) emitted from the notification unit 26.

[Second Example of Stereophonic Sound Function (User's Action Control)]

The notification unit 26 may provide a sound that induces a reflective action of the user 1 to the user 1 on the basis of the stereophonic sound technology according to the state of the surrounding environment with respect to the user 1.

As an example, in a case where the user 1 approaches an area requiring attention (road, building, other obstacle, or the like), the notification unit 26 can notify the user 1 by using a sound emphasized in a direction from the area requiring attention toward the user 1 (for example, a sound evoking danger).

Thus, it is possible to induce a reflective action of the user 1 in a direction away from the area requiring attention and to further improve the safety of the user 1.

For example, by the notification unit 26 making a notification such that the user 1 suddenly hears a swing sound of a bat from above, it is possible to induce the user 1 to squat.

Also in the present example, the notification unit 26 can notify the user 1 by acquiring a positional relationship between an object requiring attention and the user 1 and creating a stereophonic sound corresponding to the positional relationship.

Alternatively, another functional component other than the notification unit 26 can notify the user 1 by acquiring the positional relationship between the object requiring attention and the user 1, creating stereophonic sound data corresponding to the positional relationship, and sending the stereophonic sound data to the notification unit 26.

[Third Example of Stereophonic Sound Function (Music Fusion Experience)]

The notification unit 26 may provide the user 1 with a notification sound for the user 1 combined with music according to the state of the surrounding environment with respect to the user 1.

For example, the music provided from the notification unit 26 to the user 1 may be changed according to the distance or the relative approach speed of the user 1 with respect to the object and the area requiring attention.

As an example, the notification unit 26 may change a melody, a musical instrument sound, a tempo, and/or a volume (for example, a volume of a specific musical instrument sound) of music provided from the notification unit 26 to the user 1 according to a relationship between an object and an area requiring attention and the user 1. Furthermore, the notification unit 26 may give directivity to the degree of emphasis of music according to the state of the surrounding environment with respect to the user 1.

Thus, the user 1 can experience music that changes according to the place, time, and surrounding situation where the user 1 actually walks while quickly and intuitively grasping the state of the surrounding environment with respect to the user 1.

[Modification]

It should be noted that the embodiments and modifications disclosed in the present specification are illustrative only in all respects and are not to be construed as limiting. The above-described embodiments and modifications can be omitted, replaced, and changed in various forms without departing from the scope and spirit of the appended claims. For example, the above-described embodiments and modifications may be combined in whole or in part, and other embodiments may be combined with the above-described embodiments or modifications. Furthermore, the effects of the present disclosure described in the present specification are merely exemplification, and other effects may be provided.

A technical category embodying the above technical idea is not limited. For example, the above-described technical idea may be embodied by a computer program for causing a computer to execute one or a plurality of procedures (steps) included in a method for manufacturing or using the above-described device. In addition, the above-described technical idea may be embodied by a computer-readable non-transitory recording medium in which such a computer program is recorded.

The present disclosure can also have the following configurations.

[Item 1]

An environmental state notification device, including:

an environment information acquisition unit that is attached to a user and acquires environment information data indicating information regarding a surrounding environment of the user;

an environmental state recognition unit that recognizes a state of a surrounding environment with respect to the user on the basis of the environment information data; and a notification unit that notifies the user according to the state of the surrounding environment with respect to the user recognized by the environmental state recognition unit.

[Item 2]

The environmental state notification device according to item 1, in which the environment information acquisition unit includes a wave sensor that receives at least one of an electromagnetic wave or a sound wave from an environment surrounding the user and acquires the environment information data.

[Item 3]

The environmental state notification device according to item 2, in which the wave sensor acquires an image of an environment surrounding the user.

[Item 4]

The environmental state notification device according to item 2 or 3, in which the environment information acquisition unit includes an emission unit that emits a detection electromagnetic wave or a detection sound wave, and the wave sensor receives the reflected detection electromagnetic wave or the detection sound wave.

[Item 5]

The environmental state notification device according to any one of items 1 to 4, in which the environment information acquisition unit includes a position information acquisition unit that acquires position information of the user, and a map information collation unit that acquires the environment information data on the basis of the position information and the map information.

[Item 6]

The environmental state notification device according to item 5, in which the position information acquisition unit acquires the position information of the user from a satellite positioning system.

[Item 7]

The environmental state notification device according to any one of items 1 to 6, further including a communication unit that communicates data, in which the environmental state recognition unit recognizes the state of the surrounding environment with respect to the user on the basis of the environment information data acquired by the environment information acquisition unit and the environment information data transmitted from a first external device via the communication unit.

[Item 8]

The environmental state notification device according to any one of items 1 to 7, further including a user state information acquisition unit that acquires user state data indicating a state of the user, in which the environmental state recognition unit recognizes the state of the surrounding environment with respect to the user on the basis of the environment information data and the user state data.

[Item 9]

The environmental state notification device according to item 8, in which the user state information acquisition unit includes a sensor that detects at least one of a moving speed or an acceleration of the user.

[Item 10]

The environmental state notification device according to item 8 or 9, in which the environmental state recognition unit predicts a movement course of the user on the basis of the user state data, and recognizes the state of the surrounding environment with respect to the user on the basis of the predicted movement course of the user.

[Item 11]

The environmental state notification device according to any one of items 1 to 10, in which the environmental state recognition unit acquires a dynamic map of the surrounding environment of the user, and recognizes the state of the surrounding environment with respect to the user on the basis of the environment information data and the dynamic map.

[Item 12]

The environmental state notification device according to any one of items 1 to 11, in which the notification unit is attached to the user.

[Item 13]

The environmental state notification device according to item 12, in which the notification unit notifies the user through at least one of hearing, vision, or tactile sense.

[Item 14]

The environmental state notification device according to any one of items 1 to 13, in which the notification unit notifies a second external device that exists in the surrounding environment of the user and is not attached to the user according to the state of the surrounding environment with respect to the user recognized by the environmental state recognition unit.

[Item 15]

The environmental state notification device according to item 14, in which the second external device is a vehicle.

[Item 16]

The environmental state notification device according to any one of items 1 to 15, further including a communication unit that communicates data, in which the communication unit transmits, to a third external device, data indicating a state of the surrounding environment with respect to the user recognized by the environmental state recognition unit.

[Item 17]

The environmental state notification device according to any one of items 1 to 16, further including an attachment state detection unit that detects an attachment state of the environment information acquisition unit with respect to the user, in which the notification unit notifies the user according to a detection result of the attachment state detection unit.

[Item 18]

An environmental state notification method, including the steps of:

acquiring, by an environment information acquisition unit that is attached to a user, environment information data indicating information regarding a surrounding environment of the user;

recognizing, by an environmental state recognition unit, a state of a surrounding environment with respect to the user on the basis of the environment information data; and notifying, by a notification unit, the user according to the state of the surrounding environment with respect to the user recognized by the environmental state recognition unit.

[Item 19]

A program for causing a computer to execute:

a procedure of acquiring, by an environment information acquisition unit that is attached to a user, environment information data indicating information regarding a surrounding environment of the user;

a procedure of recognizing, by an environmental state recognition unit, a state of a surrounding environment with respect to the user on the basis of the environment information data; and a procedure of notifying, by a notification unit, the user according to the state of the surrounding environment with respect to the user recognized by the environmental state recognition unit.

REFERENCE SIGNS LIST

1 User
10 Environmental state notification device
11 Wearable device
21 Attachment unit
22 Control unit
23 Memory
24 Environmental information acquisition unit
25 Environmental state recognition unit
26 Notification unit
27 Attachment state detection unit
28 User state information acquisition unit
29 Communication unit
31 Imaging device
32 Image analysis device
35 Emitter
36 Receiver
37 Received data analysis device
40 Position information acquisition unit
41 Map information collation unit
43 Map information providing device
44 Position information analysis device
51 to 54 External device
55 External communication unit
61 External sensor
62 External information analysis unit
63 Internal sensor
64 Internal information analysis unit
65 Communication information analysis unit
66 Dynamic map providing unit
D11 Environment information data
D12 Notification instruction signal
D13 User state data
D14 Surrounding environmental state data

The invention claimed is:

1. An environmental state notification device, comprising:

an environment information acquisition unit configured to acquire first environment information data indicating information regarding a surrounding environment of a user, wherein the environment information acquisition unit is attached to the user;

a user state information acquisition unit configured to acquire, by a plurality of sensors, first user state data that indicates a state of the user, wherein the user state information acquisition unit includes the plurality of sensors, and the state of the user indicates at least one of a speed or an acceleration of movement of the user;

a communication unit configured to acquire, from an external moving object, second user state data, wherein the second user state data indicates a second state of the user, and the external moving object exists in the surrounding environment of the user;

an environmental state recognition unit configured to:

recognize a state of the surrounding environment with respect to the user based on the acquired first environment information data, the acquired first user state data, and the acquired second user state data; and determine that the user approaches a specific object requiring attention; and a notification unit configured to notify the user by a stereophonic sound, based on the recognized state of the surrounding environment with respect to the user, wherein the stereophonic sound is emphasized in a direction from the specific object requiring attention toward the user.

2. The environmental state notification device according to claim 1, wherein the environment information acquisition unit includes a wave sensor, and the wave sensor is configured to:

receive at least one of an electromagnetic wave or a sound wave from the surrounding environment of the user; and acquire the first environment information data.

3. The environmental state notification device according to claim 2, wherein the wave sensor is further configured to acquire an image of the surrounding environment of the user.

4. The environmental state notification device according to claim 2, wherein the environment information acquisition unit further includes an emission unit configured to emit a detection electromagnetic wave or a detection sound wave, and the wave sensor is further configured to receive a reflected detection electromagnetic wave or the detection sound wave.

5. The environmental state notification device according to claim 1, wherein the environment information acquisition unit further comprises:

a position information acquisition unit configured to acquire position information of the user; and a map information collation unit configured to acquire the first environment information data, based on the position information and map information.

6. The environmental state notification device according to claim 5, wherein the position information acquisition unit is further configured to acquire the position information of the user from a satellite positioning system.

7. The environmental state notification device according to claim 1, wherein the environmental state recognition unit is further configured to recognize the state of the surrounding environment with respect to the user based on the first environment information data acquired by the environment information acquisition unit, and second environment information data transmitted from the external moving object via the communication unit.

8. The environmental state notification device according to claim 1, wherein the environmental state recognition unit is further configured to:

predict a movement course of the user based on the first user state data; and recognize the state of the surrounding environment with respect to the user based on the predicted movement course of the user.

9. The environmental state notification device according to claim 1, wherein the environmental state recognition unit is further configured to:

acquire a dynamic map of the surrounding environment of the user; and recognize the state of the surrounding environment with respect to the user, based on the first environment information data and the dynamic map.

10. The environmental state notification device according to claim 1, wherein the notification unit is attached to the user.

11. The environmental state notification device according to claim 10, wherein the notification unit is further configured to notify the user through at least one of hearing, vision, or tactile sense.

12. The environmental state notification device according to claim 1, wherein the notification unit is further configured to notify a first external device based on the state of the surrounding environment with respect to the user, the first external device exists in the surrounding environment of the user, and the first external device is not attached to the user.

13. The environmental state notification device according to claim 12, wherein the first external device is a vehicle.

14. The environmental state notification device according to claim 1, wherein the communication unit is further configured to transmit, to a second external device, data indicating the state of the surrounding environment with respect to the user.

15. An environmental state notification method, comprising:

acquiring, by an environment information acquisition unit, environment information data indicating information regarding a surrounding environment of a user, wherein the environment information acquisition unit is attached to the user;

acquiring, by a user state information acquisition unit, first user state data using a plurality of sensors, wherein the first user state data indicates a state of the user, the user state information acquisition unit includes the plurality of sensors, and the state of the user indicates at least one of a speed or an acceleration of movement of the user;

acquiring, by a communication unit, second user state data from an external moving object, wherein the second user state data indicates a second state of the user, and the external moving object exists in the surrounding environment of the user;

recognizing, by an environmental state recognition unit, a state of the surrounding environment with respect to the user based on the acquired environment information data, the acquired first user state data, and the acquired second user state data;

determining that the user approaches a specific object requiring attention; and notifying, by a notification unit, the user by a stereophonic sound, based on the recognized state of the surrounding environment with respect to the user, wherein the stereophonic sound is emphasized in a direction from the specific object requiring attention toward the user.

16. A non-transitory computer-readable medium having stored thereon, computer-executable instructions which, when executed by a computer, cause the computer to execute operations, the operations comprising:

acquiring, by an environment information acquisition unit, environment information data indicating information regarding a surrounding environment of a user, wherein the environment information acquisition unit is attached to the user;

acquiring, by a user state information acquisition unit, first user state data using a plurality of sensors, wherein the first user state data indicates a state of the user, the user state information acquisition unit includes the plurality of sensors, and the state of the user indicates at least one of a speed or an acceleration of movement of the user;

acquiring, by a communication unit, second user state data from an external moving object, wherein the second user state data indicates a second state of the user, and the external moving object exists in the surrounding environment of the user;

recognizing, by an environmental state recognition unit, a state of the surrounding environment with respect to the user based on the acquired environment information data, the acquired first user state data, and the acquired second user state data;

determining that the user approaches a specific object requiring attention; and notifying, by a notification unit, the user by a stereophonic sound, based on the recognized state of the surrounding environment with respect to the user, wherein the stereophonic sound is emphasized in a direction from the specific object requiring attention toward the user.

17. The environmental state notification device according to claim 1, further comprising an attachment state detection unit configured to detect an attachment state of the environment information acquisition unit with respect to the user, wherein the notification unit is further configured to notify the user based on a detection result of the attachment state detection unit.

18. The environmental state notification device according to claim 1, wherein the environmental state recognition unit is further configured to acquire a positional relationship between the specific object requiring attention and the user, and the notification unit is further configured to notify, based on the acquired positional relationship, the user with the stereophonic sound.

19. The environmental state notification device according to claim 1, wherein the emphasized stereophonic sound is a sound that evokes danger.

20. The environmental state notification device according to claim 1, wherein the emphasized stereophonic sound is a sound that prompts a reflexive action of the user in a direction away from the specific object requiring attention.

* * * * *